US007561302B2

(12) United States Patent
Niimi et al.

(10) Patent No.: US 7,561,302 B2
(45) Date of Patent: Jul. 14, 2009

(54) IMAGE FORMATION CONTROLLING DEVICE, METHOD AND PROGRAM

(75) Inventors: Akiko Niimi, Kasugai (JP); Takeshi Watanabe, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 585 days.

(21) Appl. No.: 11/235,324

(22) Filed: Sep. 27, 2005

(65) Prior Publication Data

US 2006/0066914 A1 Mar. 30, 2006

(30) Foreign Application Priority Data

Sep. 28, 2004 (JP) ............................ 2004-281570

(51) Int. Cl.
*H04N 1/00* (2006.01)
*G03F 3/08* (2006.01)
*G06K 9/00* (2006.01)
*G09G 5/02* (2006.01)

(52) U.S. Cl. ........................ 358/1.9; 358/518; 358/520; 382/162; 382/167; 345/619; 345/591; 345/593

(58) Field of Classification Search .................. 358/1.9, 358/504, 518, 520, 525, 1.131, 14, 3.28, 358/1.12; 382/162, 167, 299, 300; 345/418, 345/419, 619, 589, 591, 593; 717/111, 113, 717/110
See application file for complete search history.

(56) References Cited

U.S. PATENT DOCUMENTS

| | | | | |
|---|---|---|---|---|
| 6,421,141 | B2 * | 7/2002 | Nishikawa | 358/1.9 |
| 6,972,865 | B1 * | 12/2005 | Muramatsu | 358/1.2 |
| 6,999,068 | B2 * | 2/2006 | Sobol | 345/418 |
| 2004/0227964 | A1 | 11/2004 | Fujino | |

FOREIGN PATENT DOCUMENTS

| | | |
|---|---|---|
| JP | 7-46416 | 2/1995 |
| JP | 8-191400 | 7/1996 |
| JP | A 2001-292331 | 10/2001 |
| JP | 2004-215235 | 7/2004 |

* cited by examiner

*Primary Examiner*—Edward L Coles
*Assistant Examiner*—Charlotte M Baker
(74) *Attorney, Agent, or Firm*—Oliff & Berridge, PLC

(57) ABSTRACT

An image formation control system including an input system that is adapted to input instruction signals concerning a vividness enhancement target color of image signals from a user, and a vividness enhancement processing system that is adapted to apply a vividness enhancement process by converting at least one first area of a color space concerning the image signals to a single vividness enhancement target color corresponding to each first area according to the instruction signals from the user input through the input system, and by determining a second area which is the remaining area of the color space wherein the vividness enhancement process is not applied is provided. The image signals processed with the vividness enhancement process are converted to output data for a printer.

26 Claims, 31 Drawing Sheets

TABLE1 (MONITOR MATCHING)

| ORIGINAL RGB VALUE | SUBTRACTING VALUE | CONVERTED RGB VALUE |
|---|---|---|
| 0,0,0 | 0,0,0 | 0,0,0 |
| 1,0,0 | 0,0,0 | 1,0,0 |
| 1,1,1 | 0,0,0 | 1,1,1 |
| 0,1,0 | 0,0,0 | 0,1,0 |
| 0,1,1 | 0,0,0 | 0,1,1 |
| 0,0,1 | 0,0,0 | 0,0,1 |
| : | : | : |
| 255,255,255 | 0,0,0 | 255,255,255 |

FIG.13A

TABLE2 (PHOTOGRAPH)

| AREA | | ORIGINAL RGB VALUE | SUBTRACTING VALUE | CONVERTED RGB VALUE | |
|---|---|---|---|---|---|
| FIRST AREA | | 0,0,0 | 0,0,0 | 0,0,0 | ← SHARPENING TARGET COLOR |
| FIRST AREA | | 1,0,0 | 1,0,0 | 0,0,0 | |
| FIRST AREA | | : | : | : | |
| FIRST AREA | | 12,14,18 | 12,14,18 | 0,0,0 | |
| FIRST AREA | | 12,14,19 | 12,14,19 | 0,0,0 | |
| SECOND AREA | TRANSITION AREA | 13,14,19 | 10,14,19 | 3,0,0 | |
| SECOND AREA | TRANSITION AREA | 14,14,19 | 9,13,17 | 5,1,2 | |
| SECOND AREA | TRANSITION AREA | : | : | : | |
| SECOND AREA | TRANSITION AREA | 24,25,25 | 4,4,4 | 20,21,21 | |
| SECOND AREA | TRANSITION AREA | : | : | : | |
| SECOND AREA | TRANSITION AREA | 35,37,33 | 0,0,1 | 35,37,32 | |
| SECOND AREA | TRANSITION AREA | 35,37,34 | 0,1,0 | 35,36,34 | |
| SECOND AREA | UNCONVERTED DATA AREA | 35,38,34 | 0,0,0 | 35,38,34 | |
| SECOND AREA | UNCONVERTED DATA AREA | 36,38,34 | 0,0,0 | 36,38,34 | |
| SECOND AREA | UNCONVERTED DATA AREA | : | : | : | |
| SECOND AREA | UNCONVERTED DATA AREA | 255,255,254 | 0,0,0 | 255,255,254 | |
| SECOND AREA | UNCONVERTED DATA AREA | 255,255,255 | 0,0,0 | 255,255,255 | |

FIG.13B

TABLE3 (GRAPHIC)

| Area | ORIGINAL RGB VALUE | SUBTRACTING VALUE | CONVERTED RGB VALUE | |
|---|---|---|---|---|
| FIRST AREA | 0,0,0 | 0,0,0 | 0,0,0 | ← SHARPENING TARGET COLOR |
| | 1,0,0 | 1,0,0 | 0,0,0 | |
| | : | : | : | |
| | 35,37,34 | 35,37,34 | 0,0,0 | |
| | : | : | : | |
| | 55,52,53 | 55,52,53 | 0,0,0 | |
| | 55,52,54 | 55,52,54 | 0,0,0 | |
| SECOND AREA – TRANSITION AREA | 56,53,54 | 48,47,46 | 8,6,8 | |
| | 56,53,55 | 42,40,41 | 14,13,14 | |
| | : | : | : | |
| | 62,64,63 | 12,12,12 | 50,52,51 | |
| | : | : | : | |
| | 70,71,70 | 8,9,7 | 62,62,63 | |
| | 70,71,71 | 0,3,0 | 70,68,71 | |
| SECOND AREA – UNCONVERTED DATA AREA | 70,72,71 | 0,0,0 | 70,72,71 | |
| | 71,72,71 | 0,0,0 | 71,72,71 | |
| | : | : | : | |
| | 255,255,254 | 0,0,0 | 255,255,254 | |
| | 255,255,255 | 0,0,0 | 255,255,255 | |

FIG.14A

TABLE4 (VIVID)

| Area | ORIGINAL RGB VALUE | SUBTRACTING VALUE | CONVERTED RGB VALUE | |
|---|---|---|---|---|
| FIRST AREA | 0,0,0 | 0,0,0 | 0,0,0 | ← SHARPENING TARGET COLOR |
| | 1,0,0 | 1,0,0 | 0,0,0 | |
| | : | : | : | |
| | 53,53,54 | 53,53,54 | 0,0,0 | |
| | : | : | : | |
| | 71,72,70 | 71,72,70 | 0,0,0 | |
| | 71,72,71 | 71,72,71 | 0,0,0 | |
| SECOND AREA – TRANSITION AREA | 72,72,71 | 52,50,51 | 22,22,20 | |
| | : | : | : | |
| | 80,82,81 | 35,37,36 | 45,45,45 | |
| | : | : | : | |
| | 89,88,91 | 0,5,0 | 89,83,91 | |
| SECOND AREA – UNCONVERTED DATA AREA | 89,89,91 | 0,0,0 | 89,89,91 | |
| | 90,89,91 | 0,0,0 | 90,89,91 | |
| | : | : | : | |
| | 255,255,254 | 0,0,0 | 255,255,254 | |
| | 255,255,255 | 0,0,0 | 255,255,255 | |

FIG.14B

BLACK GENERATION TABLE

| RGB VALUE | CMYK VALUE |
|---|---|
| 0,0,0 | 0,0,0,100 |
| : | : |
| 255,0,0 | 0,89,98,0 |
| : | : |
| 255,128,0 | 0,46,60,0 |
| : | : |
| 0,255,0 | 67,0,69,0 |
| : | : |
| 178,178,178 | 47,40,45,5 |
| : | : |
| 255,255,255 | 0,0,0,0 |

FIG.17

TABLE2R (PHOTOGRAPH)

| AREA | RGB VALUE | SUBTRACTING VALUE | CONVERTED RGB VALUE |
|---|---|---|---|
| SECOND AREA (TRANSITION AREA) | : | : | : |
| FIRST AREA | 255,0,0 | 0,0,0 | 255,0,0 ← SHARPENING TARGET COLOR (PLAIN RED) |
| | 255,1,0 | 0,0,1 | 255,0,0 |
| | 254,0,0 | −1,0,0 | 255,0,0 |
| | : | : | : |
| | 248,15,15 | −8,15,15 | 255,0,0 |
| SECOND AREA — TRANSITION AREA | 247,15,15 | −5,12,12 | 255,3,3 |
| | : | : | : |
| | 240,15,15 | 1,0,0 | 241,0,0 |
| SECOND AREA — UNCONVERTED DATA AREA | 239,15,15 | 0,0,0 | 239,15,15 |
| | : | : | : |
| | 255,255,255 | 0,0,0 | 255,255,255 |

FIG.20

FIG.21A
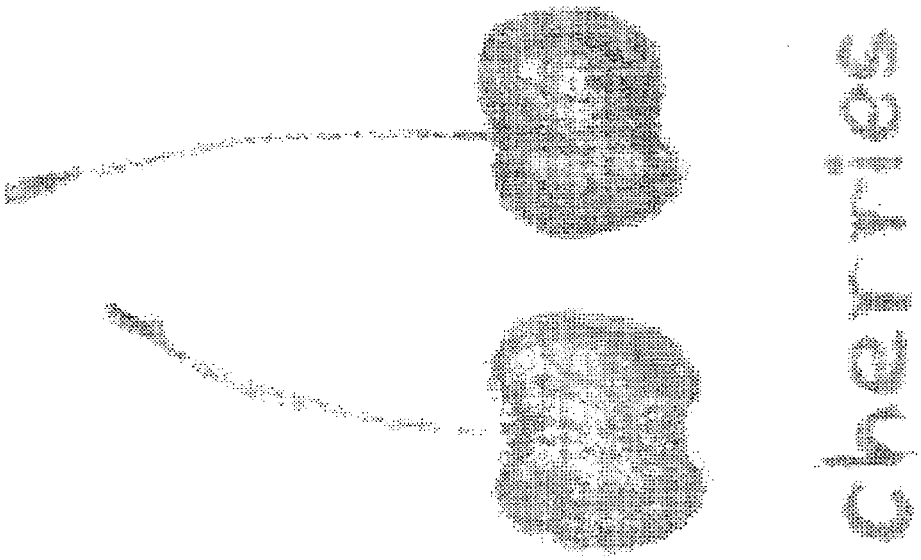
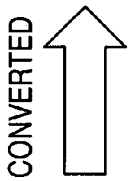
FIG.21B
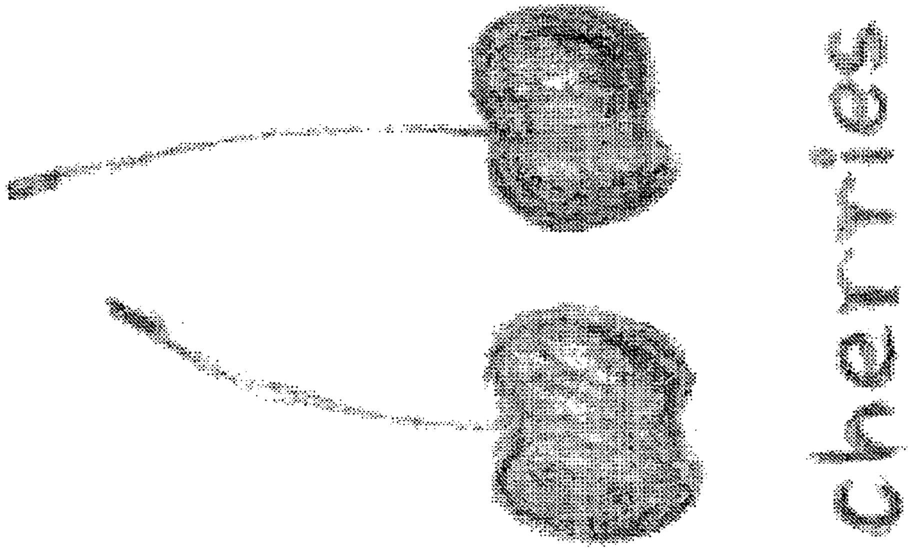

TABLE2P (PHOTOGRAPH)

| Area | ORIGINAL RGB VALUE | SUBTRACTING AREA | CONVERTED RGB VALUE | |
|---|---|---|---|---|
| SECOND AREA (TRANSITION AREA) | : | : | : | |
| FIRST AREA | 255,206,206 | 0,0,0 | 255,206,206 | ← SHARPENING TARGET COLOR |
| FIRST AREA | 254,206,206 | − 1,0,0 | 255,206,206 | |
| FIRST AREA | 253,207,206 | − 2, − 1,0 | 255,206,206 | |
| FIRST AREA | : | : | : | |
| FIRST AREA | 238,218,218 | − 17, − 12, − 12 | 255,206,206 | |
| SECOND AREA – TRANSITION AREA | 237,218,218 | − 15, − 12, − 12 | 255,206,206 | |
| SECOND AREA – TRANSITION AREA | : | : | : | |
| SECOND AREA – TRANSITION AREA | 230,218,218 | − 2, − 2, − 2 | 232,216,216 | |
| SECOND AREA – UNCONVERTED DATA AREA | 229,218,218 | 0,0,0 | 229,218,218 | |
| SECOND AREA – UNCONVERTED DATA AREA | : | : | : | |
| SECOND AREA – UNCONVERTED DATA AREA | 255,255,255 | 0,0,0 | 255,255,255 | |

FIG.22

TABLE2' (PHOTOGRAPH)

| Area | ORIGINAL RGB VALUE | SUBTRACTING VALUE | CONVERTED RGB VALUE | |
|---|---|---|---|---|
| FIRST AREA | 0,0,0 | 0,0,0 | 0,0,0 | ← SHARPENING TARGET COLOR |
| FIRST AREA | 1,0,0 | 1,0,0 | 0,0,0 | |
| FIRST AREA | : | : | : | |
| FIRST AREA | 12,14,18 | 12,14,18 | 0,0,0 | |
| FIRST AREA | 12,14,19 | 12,14,19 | 0,0,0 | |
| SECOND AREA (UNCONVERTED DATA AREA) | 13,14,19 | 0,0,0 | 13,14,19 | ← STAGED COLOR TRANSITION (PSEUDO-OUTLINE) OCCURS, BUT UNRECOGNIZABLE |
| SECOND AREA (UNCONVERTED DATA AREA) | 13,15,19 | 0,0,0 | 13,15,19 | |
| SECOND AREA (UNCONVERTED DATA AREA) | : | : | : | |
| SECOND AREA (UNCONVERTED DATA AREA) | 255,255,254 | 0,0,0 | 255,255,254 | |
| SECOND AREA (UNCONVERTED DATA AREA) | 255,255,255 | 0,0,0 | 255,255,255 | |

FIG.23

TABLE CREATED BY USER

SHARPENING TARGET COLOR (BLACK)

| AREA | ORIGINAL RGB VALUE | SUBTRACTING VALUE | CONVERTED RGB VALUE | |
|---|---|---|---|---|
| FIRST AREA | 0,0,0 | 0,0,0 | 0,0,0 | SET BY USER |
| | : | : | : | |
| | 8,7,5 | 8,7,5 | 0,0,0 | |
| | : | : | : | |
| | 15,15,15 | 15,15,15 | 0,0,0 | |
| SECOND AREA / TRANSITION AREA | 16,0,0 | 14,15,15 | 2,0,0 | SET AUTOMATICALLY |
| | : | : | : | |
| | 16,14,14 | 14,15,15 | 2,0,0 | |
| | 17,14,14 | 13,15,15 | 4,0,0 | |
| | : | : | : | |
| | 30,30,29 | 0,0,1 | 30,30,28 | |
| | 30,30,30 | 0,0,0 | 30,30,30 | |
| SECOND AREA / UNCONVERTED DATA AREA | 31,30,30 | 0,0,0 | 31,30,30 | |
| | : | : | : | |
| | 255,255,255 | 0,0,0 | 255,255,255 | |

FIG.31

IMAGE FORMATION CONTROLLING DEVICE, METHOD AND PROGRAM

CROSS REFERENCE TO RELATED APPLICATION

This application claims priority from Japanese Patent Application No. 2004-281570, filed on Sep. 28, 2004. The entire subject matter of the application is incorporated herein by reference.

BACKGROUND OF THE INVENTION

1. Technical Field

Aspects of the invention relate to an image formation controlling method, a program product containing instructions to carry out the method, and an image printing apparatus employing the image formation controlling method.

2. Related Art

Owing to improvement of the image quality and lowering of prices of color printers, color text created/edited on personal computers can be printed easily.

Generally, a color reproduction range of a display (e.g., LCD or CRT) is greater than that of a printer. Therefore, when the color text is printed, part of the color may not be reproduced. In order to deal with this problem, a color matching process, or a compression of a color space is typically carried out.

Further, in order to display a color image on the CRT, the color space is expressed using an additive color mixing process of RGB data, while, for the printer, a subtractive color mixing process of CMYK data is generally used. Therefore, a plurality of colors are mixed, subtle differences may occur between the images displayed on the CRT or LCD and printed by the printer.

As above, it has been difficult to obtain printed color images as desired by the user since the printed images are not printed as displayed on the displaying device.

In order to avoid the above problem, an image formation method to control printing quality characteristic in a printer is known. An example of such a method is disclosed in Japanese Patent Provisional Publication No. 2001-292331 (hereinafter, referred to as '331 publication). According to this '331 publication, as color space matching process, an image processing application is configured to provide a plurality of processing modes to process images. The modes include a "hue priority mode", wherein the lightest color and the darkest color in the image data are matched between the displayed image and the printed image, a "color difference minimizing mode", wherein only a portion of image data that is out of a reproductive range is mapped outside the reproductive range of the image formed by a printer are mapped to the thresholds of the range, and a "vividness priority mode", wherein the color space of part of the image data out of the reproductive range of the printer is compressed with maintaining possible color saturation. By selecting a necessary mode, a condition for color processing corresponding to the selected mode is set, and the image data is processed based on the thus selected condition.

Recently, the color printers are used for printing images on fabric such as T-shirts. When the image formation is made on the fabric (e.g., T-shirt), users tend to prefer "vigorous and sharp-contrasted" images, "clear and vivid" images, "unclouded and high-colored" images as images on the fabric to ordinary color images, which are printed on sheets of paper for office documents and the like and are required high fidelity.

In the '331 publication, control of reproductive quality of an image printed by the color printer in accordance with the difference of the reproductive ranges between the CRT (or LCD) and the printer so that the image data is reproduced in high fidelity. However, the above-described needs of the users when images are printed on fabrics cannot be fulfilled with the conventional printers such as one disclosed in '331 publication.

SUMMARY

Aspects of the present invention are advantageous in that improved image formation controlling method, device and program enabling to overcome the above-described deficiency in image printing on fabrics using the conventional color printers.

BRIEF DESCRIPTION OF THE ACCOMPANYING DRAWINGS

Figure 3:
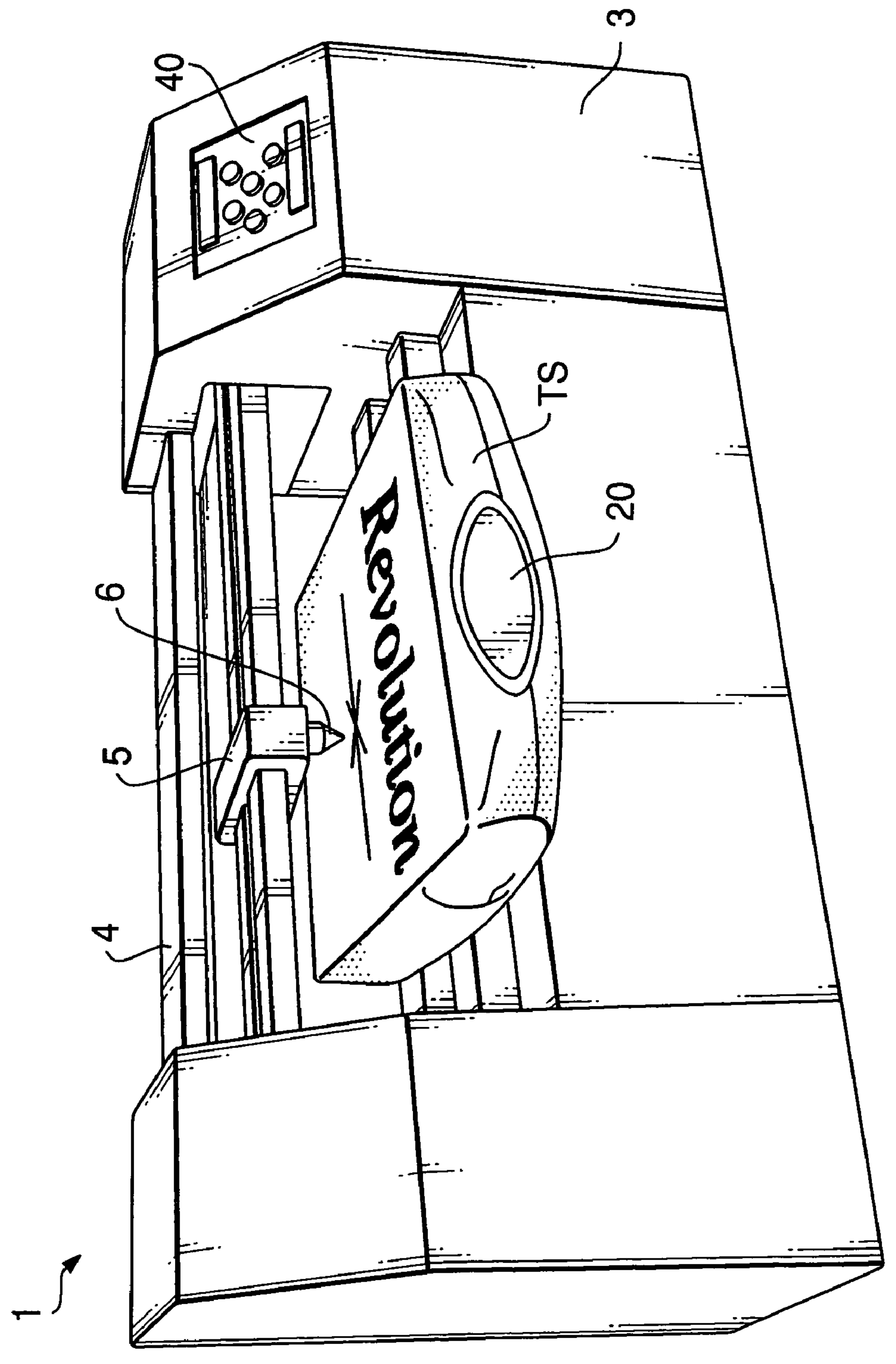
FIG. 3 is a perspective view of a T-shirt printer to be controlled by the printing system shown in FIG. 1.
Figure 4:
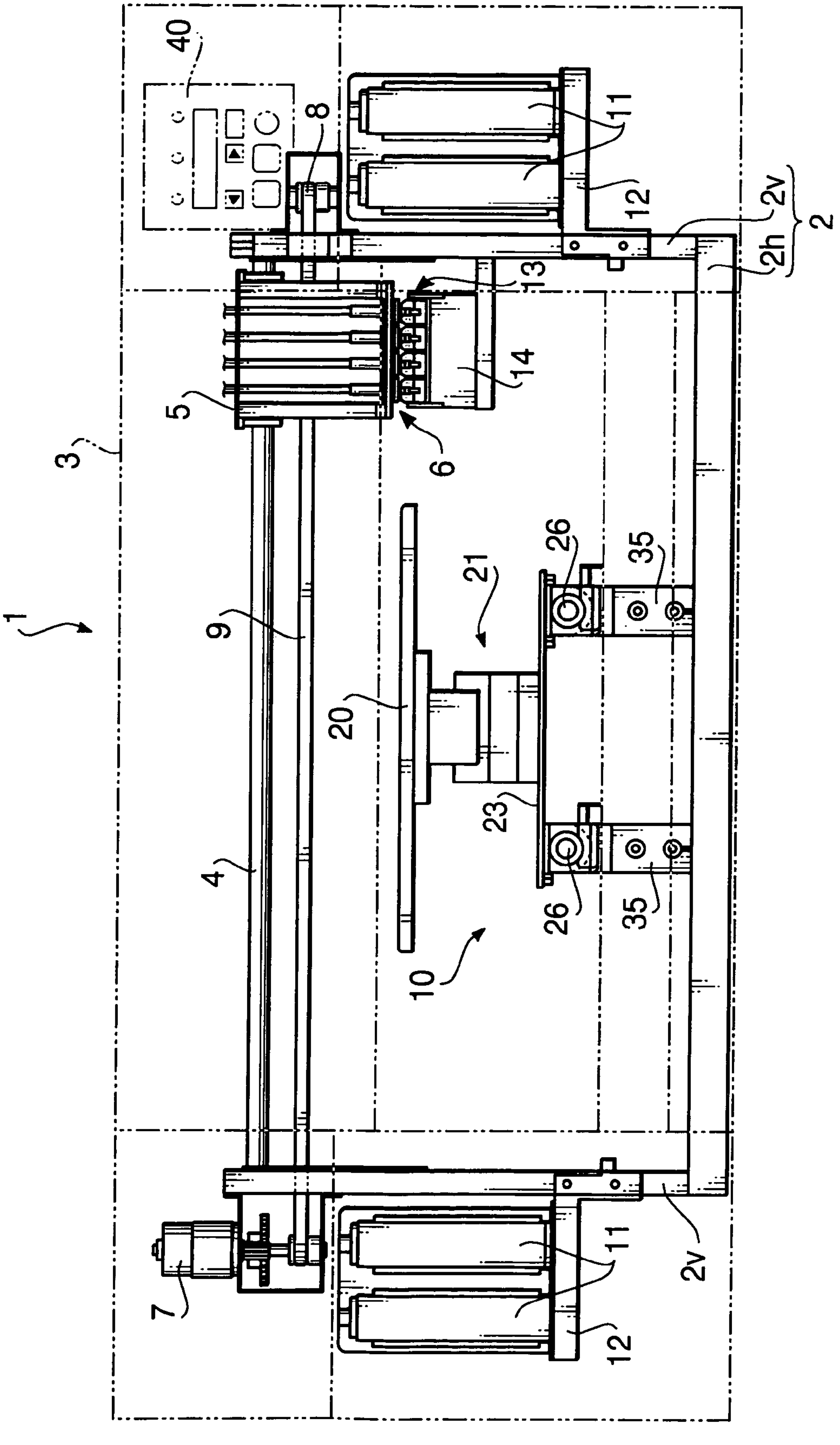

FIG. 4 schematically shows a front view of the T-shirt printer shown in FIG. 3.

Figure 5:
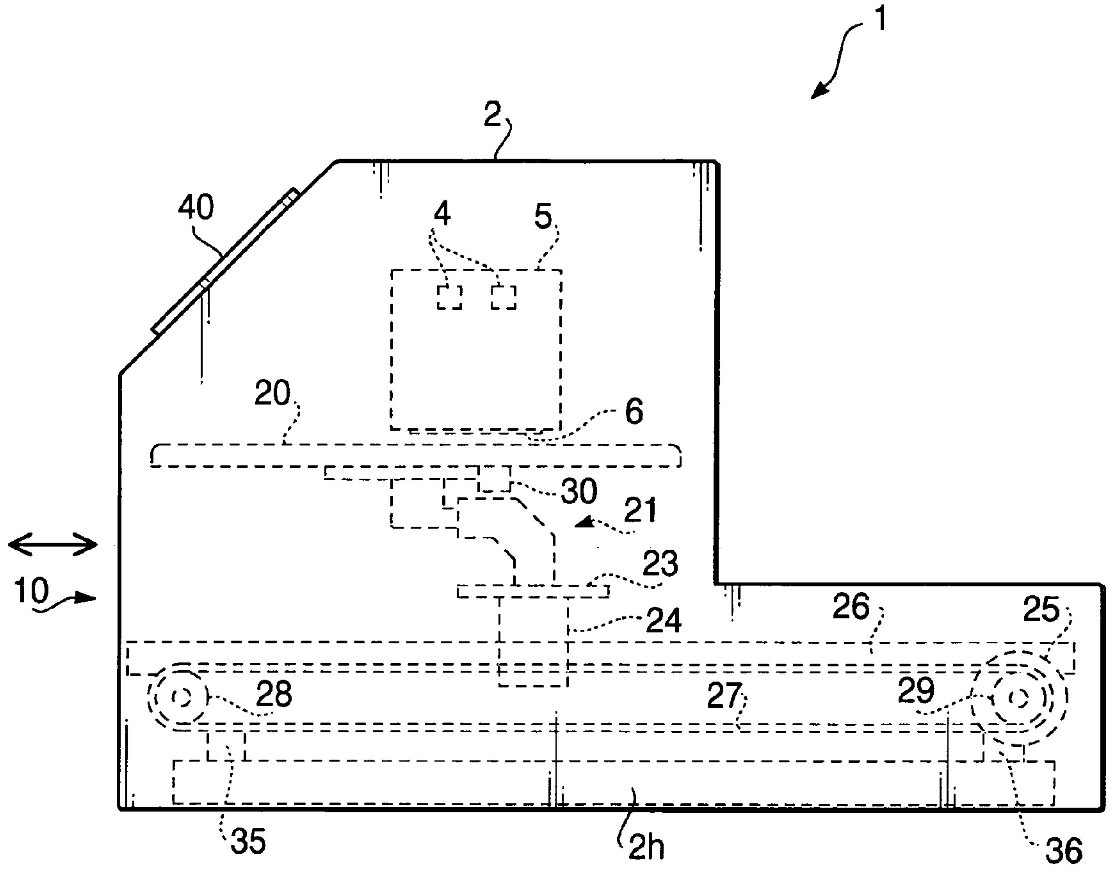

FIG. 5 schematically shows a side view of the T-shirt printer shown in FIG. 3.

Figure 6:
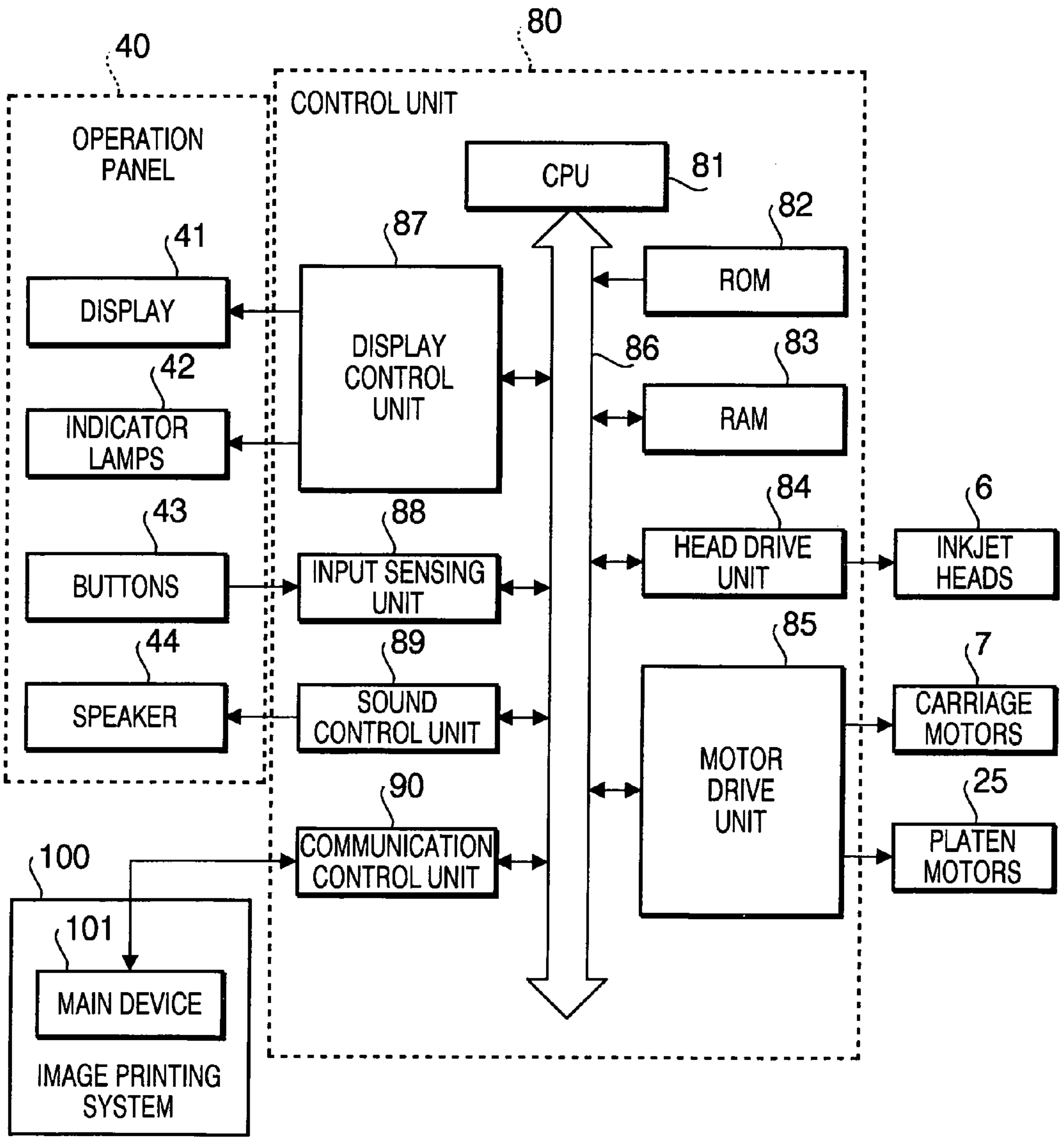

FIG. 6 is a block diagram showing an electrical configuration of the T-shirt printer shown in FIG. 3.

Figure 7A:
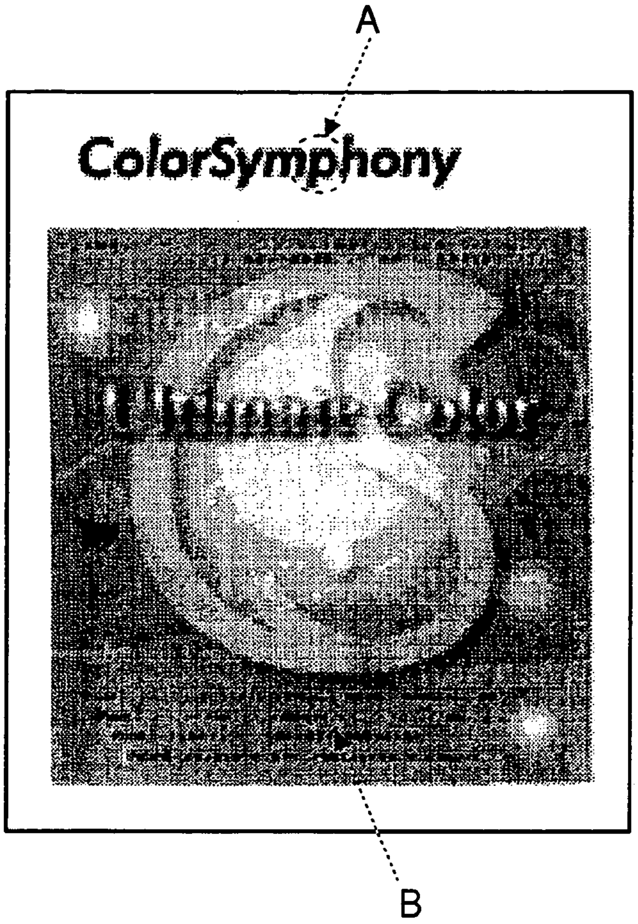

FIG. 7A is an example of an image printed by the printer in accordance with image data created by capturing a printed material with a scanner.

Figure 7B:
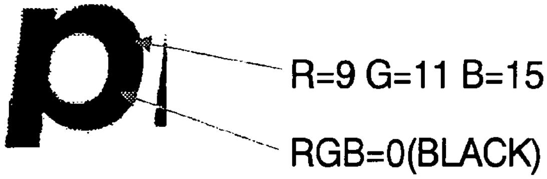

FIG. 7B is an enlarged view of an area A of the image shown in FIG. 7A.

Figure 7C:
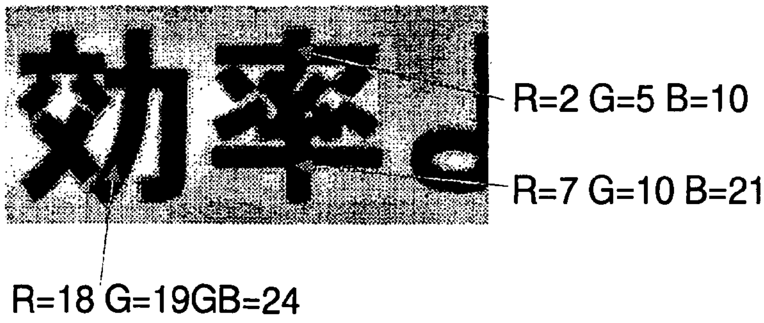

FIG. 7C is another enlarged view of an area B of the image shown in FIG. 7A.

Figure 8:

FIG. 8 is an example of an image printed by the printer in accordance with image data created by capturing a pencil drawing with a scanner.

Figures 9A, 9B, 9C:
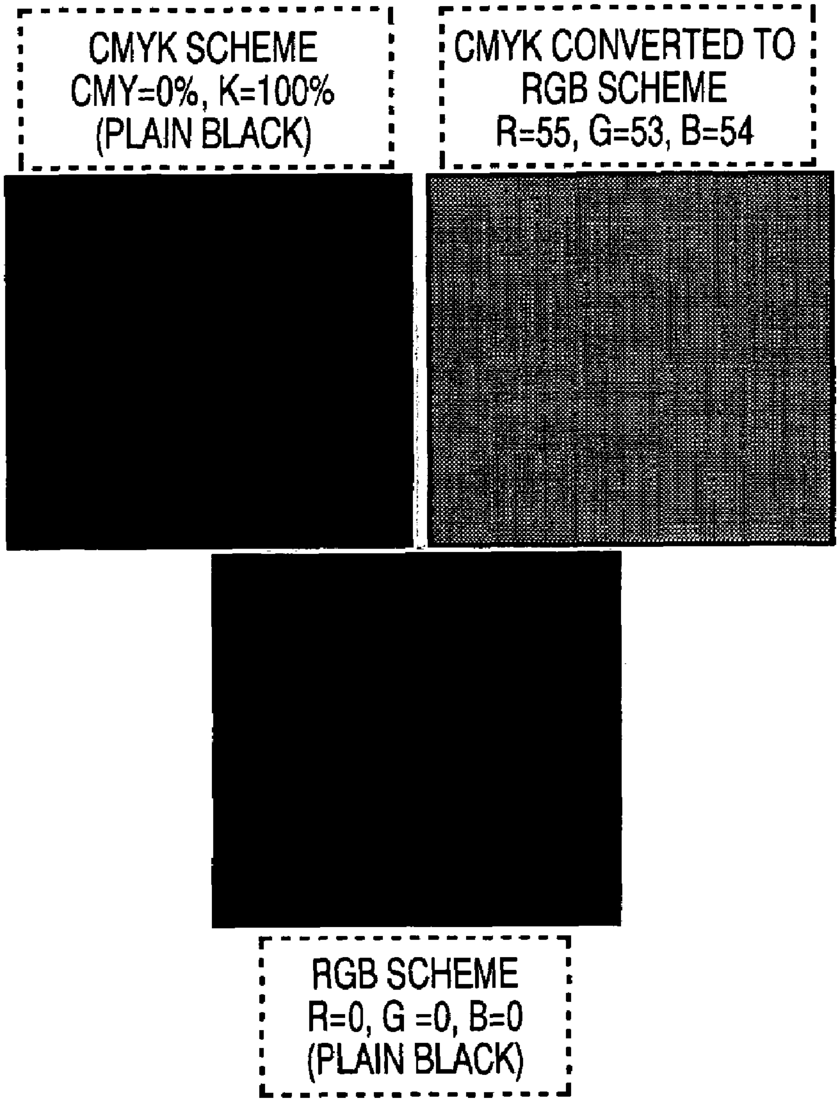

FIG. 9A is an example of black color reproduced in CMYK scheme.

FIG. 9B is an example of the black color after converting the block color in CMYK scheme into RGB scheme.

FIG. 9C is an example of the black color reproduced in normal RGB scheme.

Figure 10:
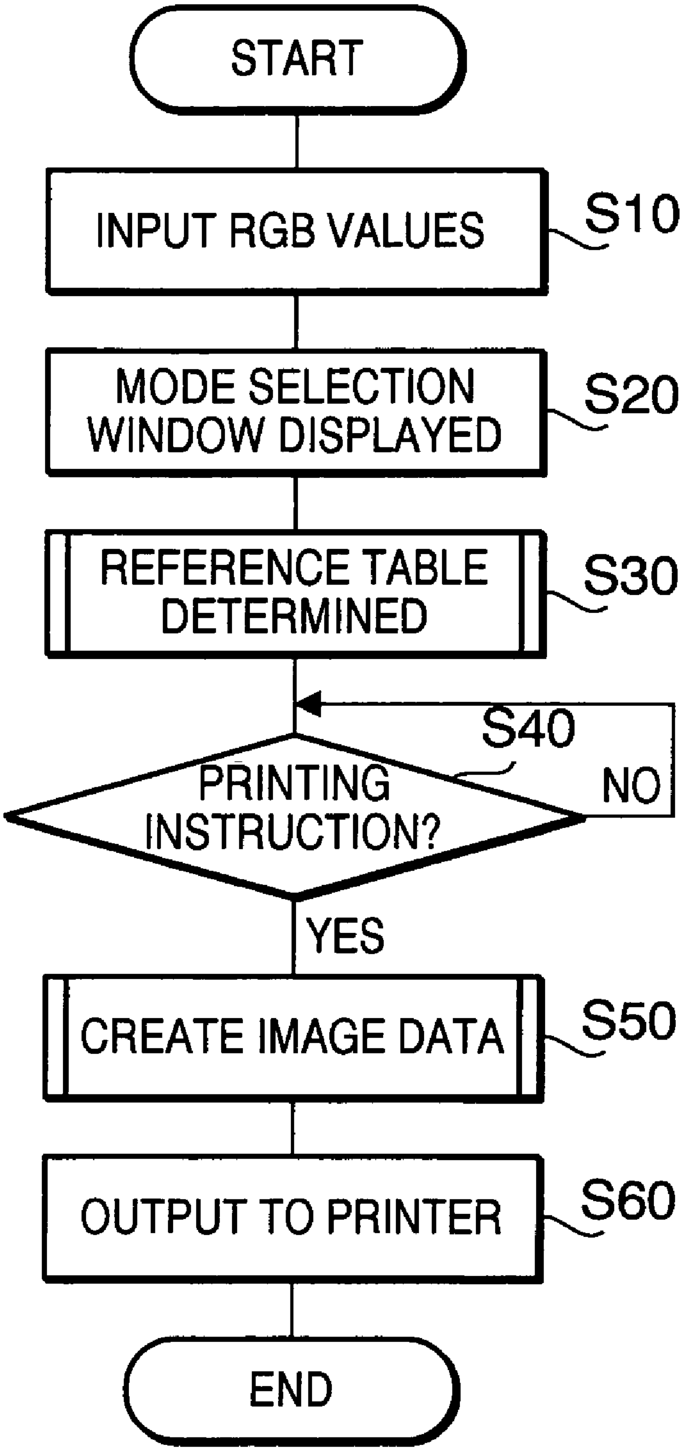

FIG. 10 is a flowchart illustrating a main procedure executed by a CPU of the printing system.

Figure 11:
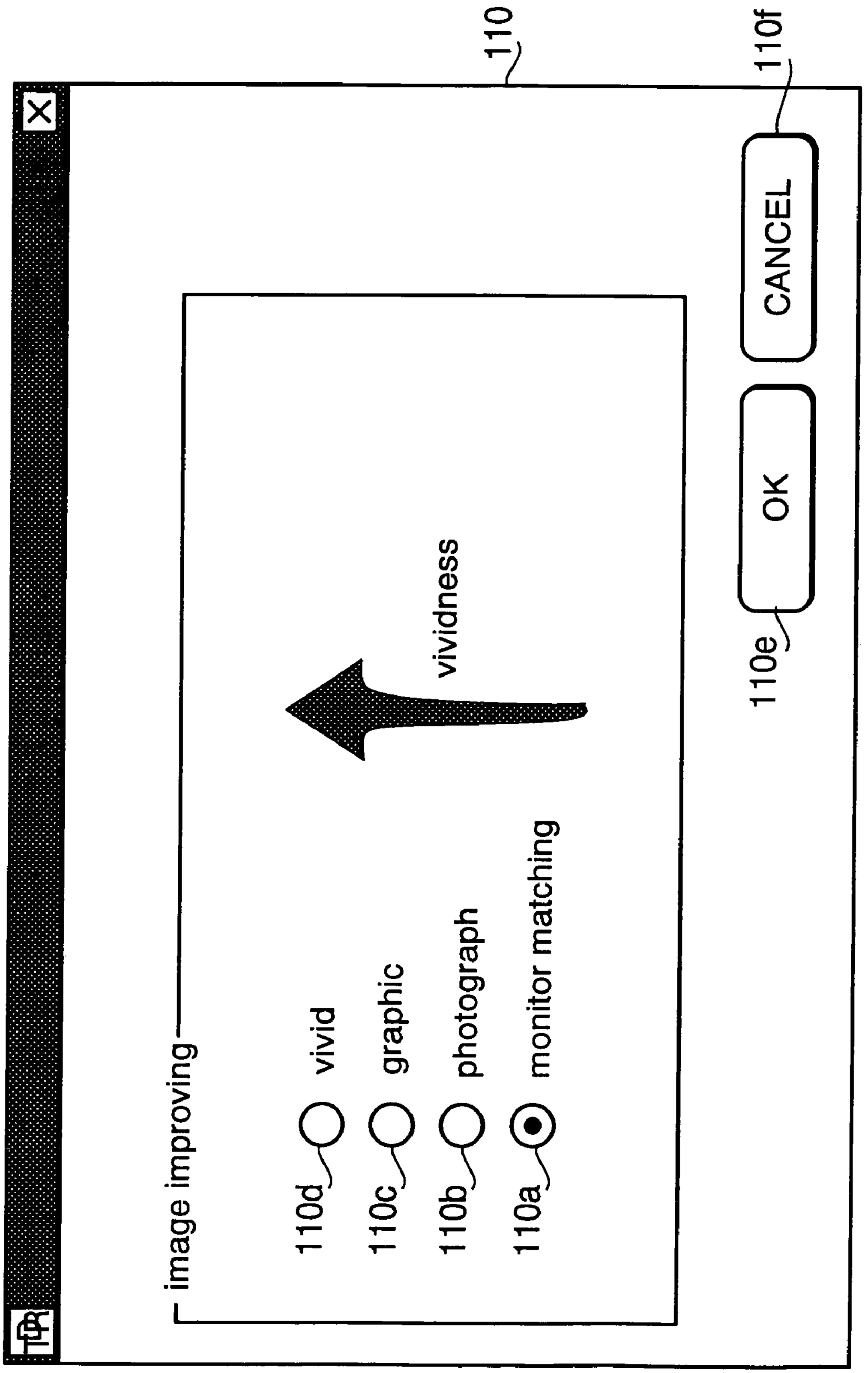

FIG. 11 is an illustrative view of a mode selection window shown on a display.

Figure 12:
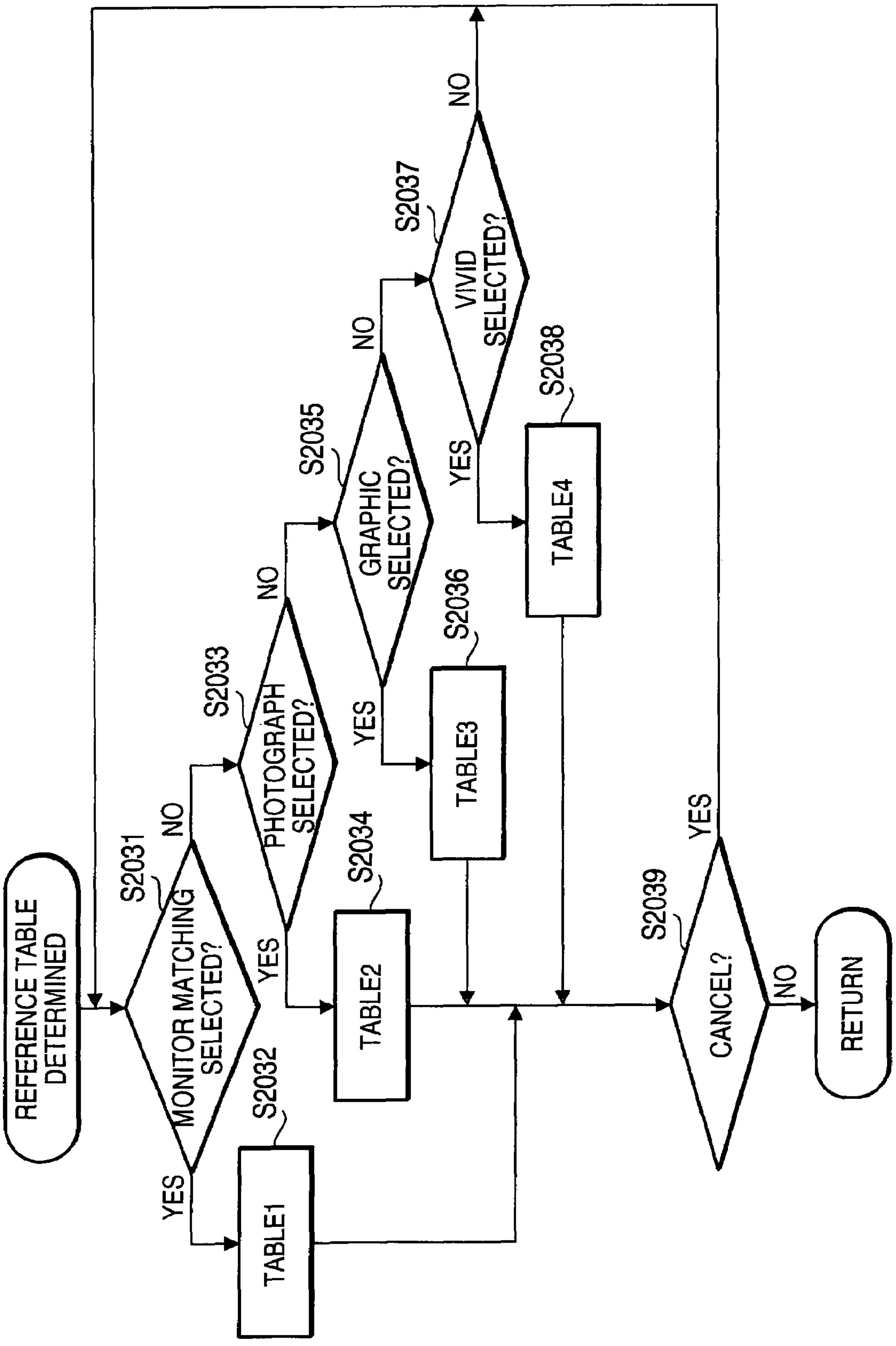

FIG. 12 is a flowchart illustrating an procedure of displaying the mode selection window shown in FIG. 11.

FIG. 13A is a table for RGB conversion provided for a "monitor matching" mode.

FIG. 13B is a table for RGB conversion provided for a "photograph" mode.

FIG. 14A is a table for RGB conversion provided for a "graphic" mode.

FIG. 14B is a table for RGB conversion provided for a "vivid" mode.

Figure 15A:
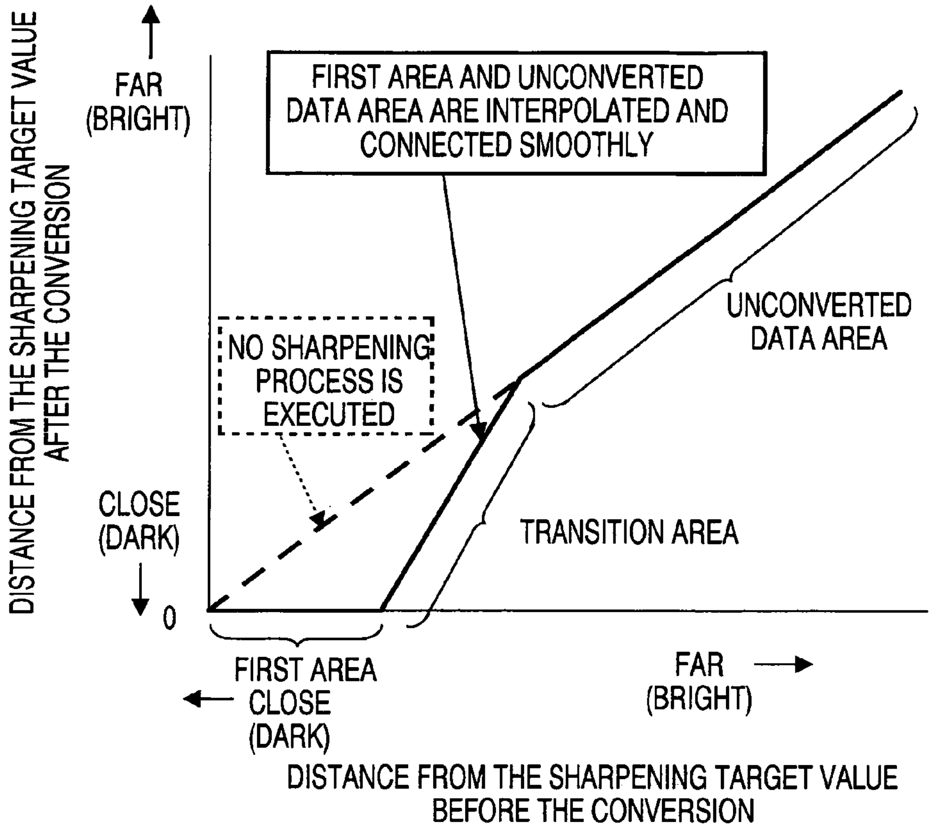
Figure 15B:
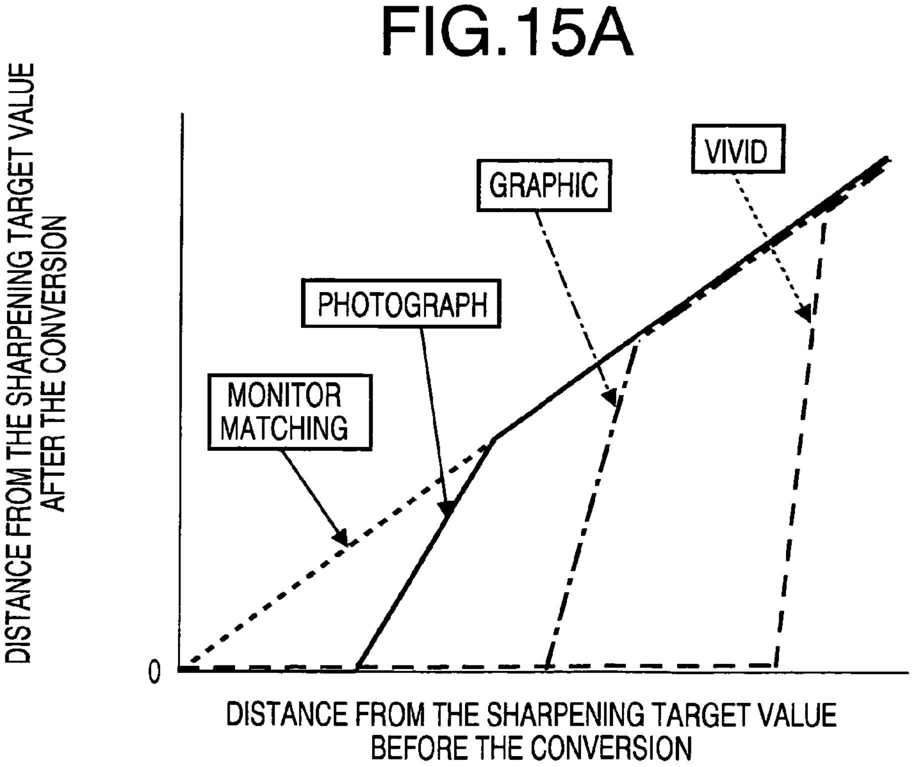

FIGS. 15A and 15B are conceptual charts illustrating processes of color transition process executed in an interpolating process.

Figure 16:
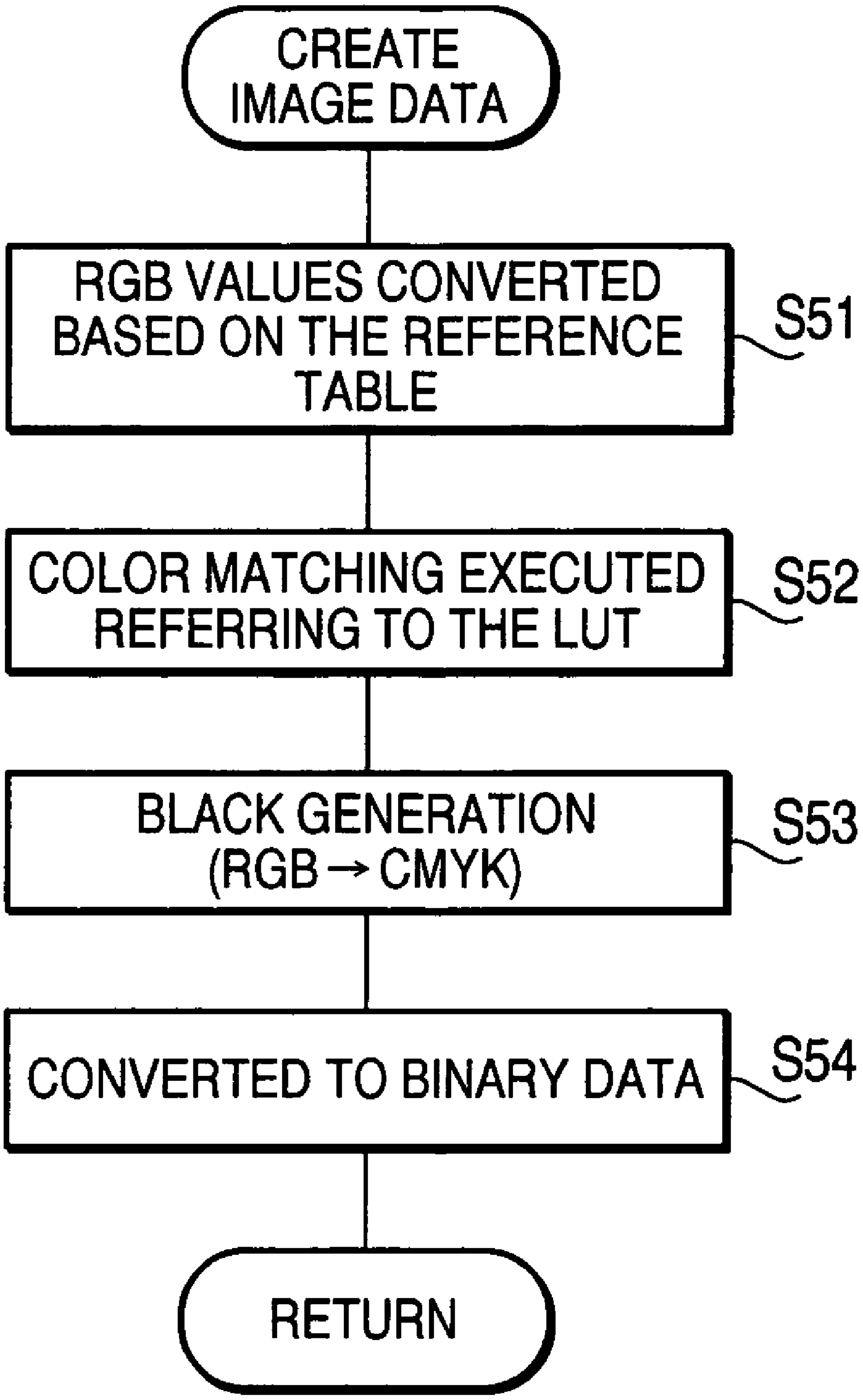

FIG. 16 is a flowchart illustrating an image data creating process called in the main procedure shown in FIG. 10.

FIG. 17 is an example of a table for RGB-CMYK conversion in a black generation process executed in the main procedure shown in FIG. 10.

Figure 18A:

FIG. 18A is an example of a printed material that are not applied with a vividness enhancement process.

Figure 18B:
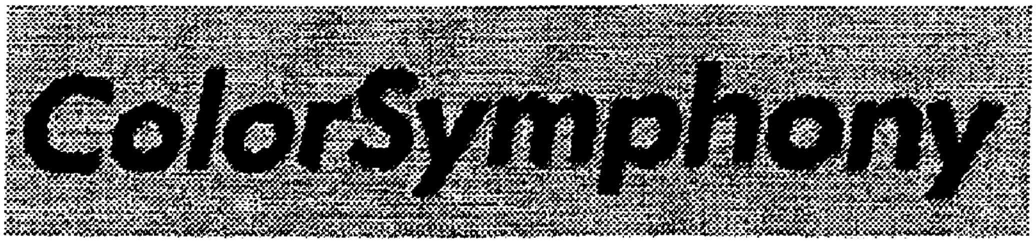

FIG. 18B is an example of a printed material that are applied with a vividness enhancement process.

Figure 19:
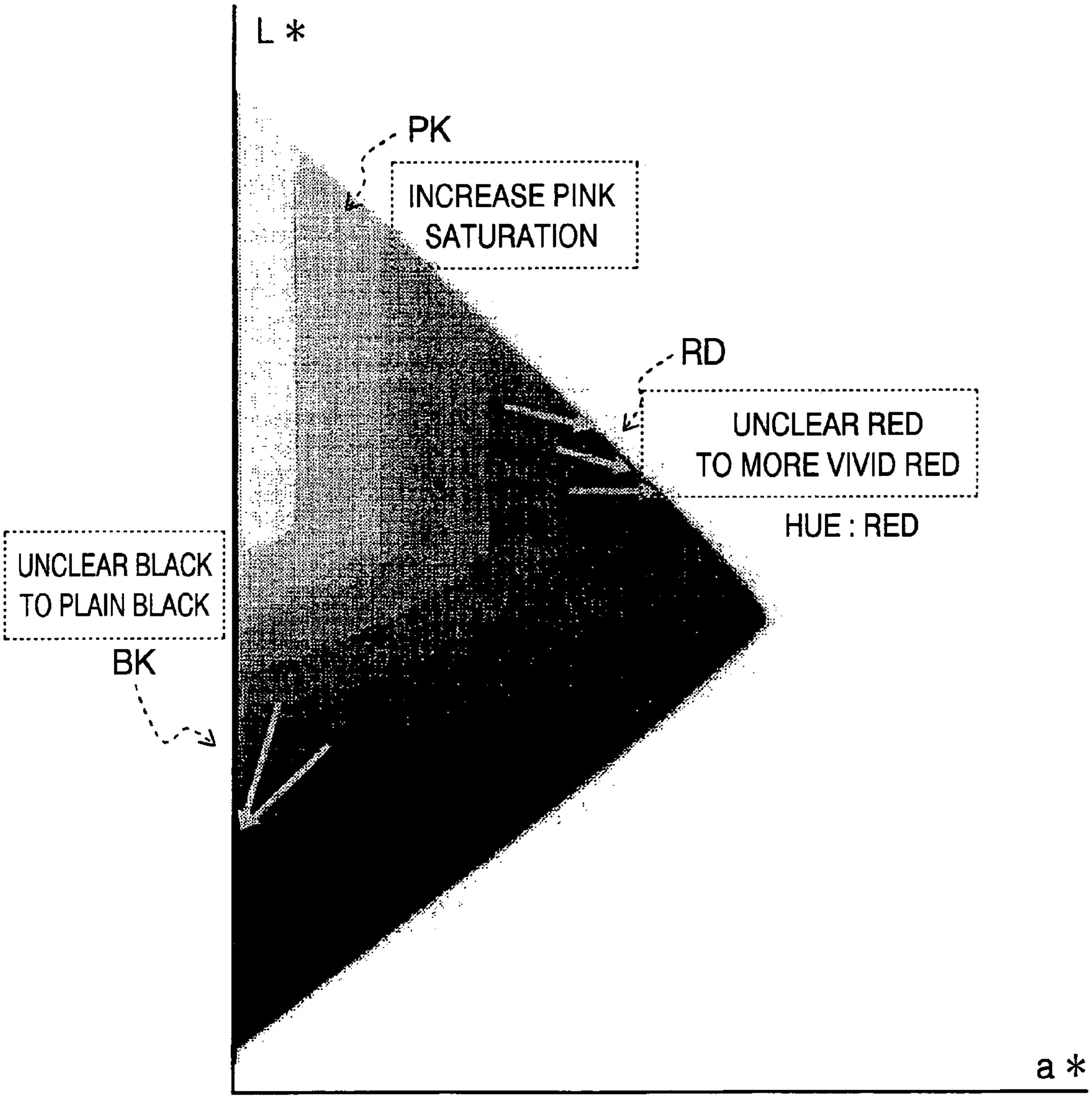

FIG. 19 is a chart illustrating transition of colors with a fixed hue in a color space defined by L*a*b* scheme.

FIG. 20 shows an example of an RGB conversion table when red is set as a target color to enhance vividness.

FIG. 21A is an example of a printed image that are not applied with a vividness enhancing process;

FIG. 21B is an example of a printed material that are applied with a vividness enhancing process.

FIG. 22 shows an example of an RGB conversion table when pink is set as a target color to enhance vividness.

FIG. 23 shows an example of an RGB conversion table when a first area is black and a transition color area is not provided.

Figure 24:
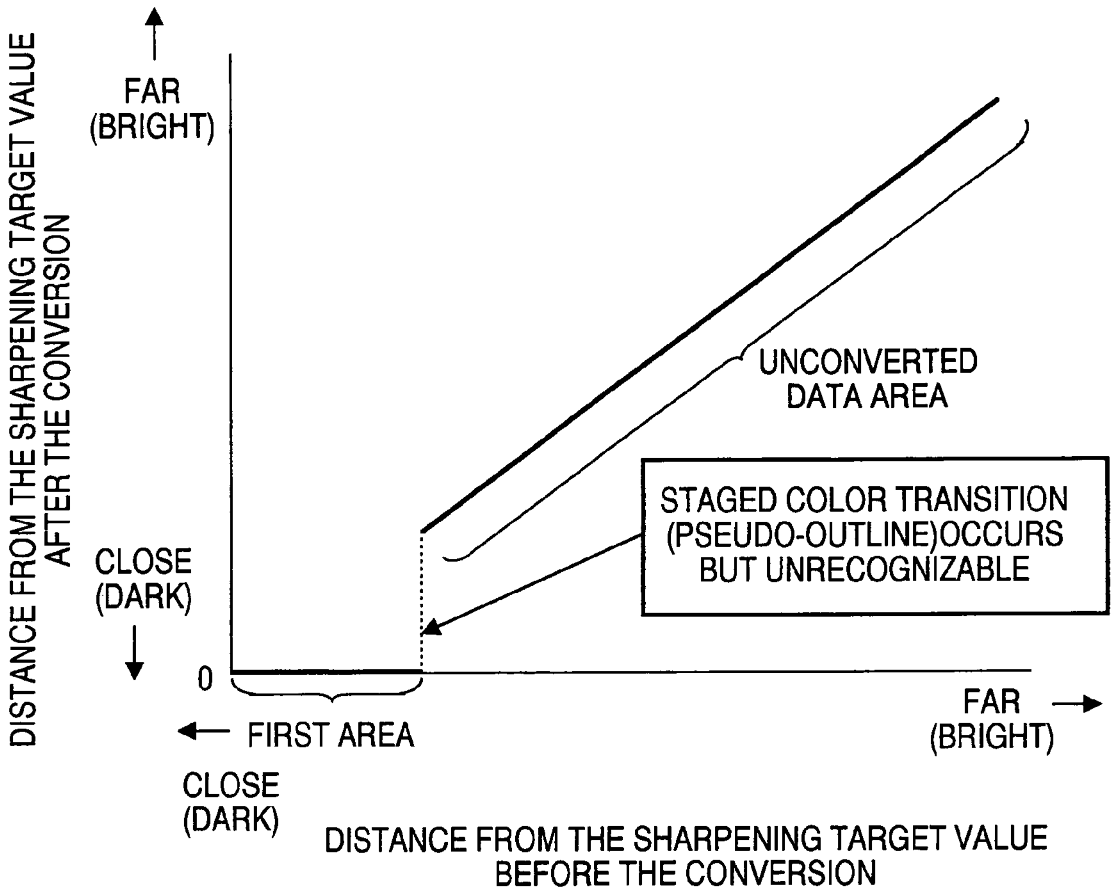

FIG. 24 is a conceptual chart illustrating the RBG conversion process indicated in FIG. 23.

Figure 25:
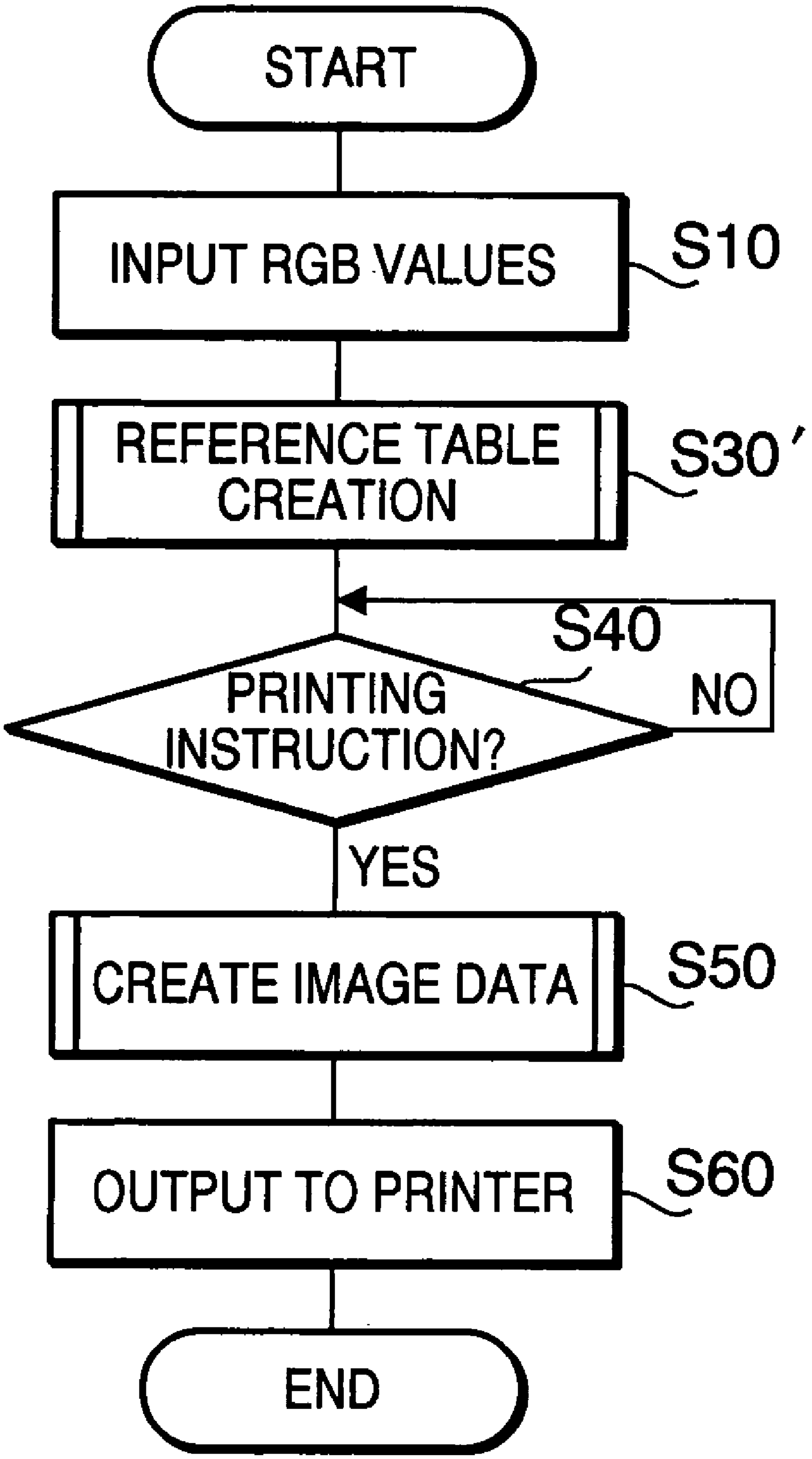

FIG. 25 is a flowchart illustrating an RGB conversion table creating procedure when the conversion table is created by a user.

Figure 26:
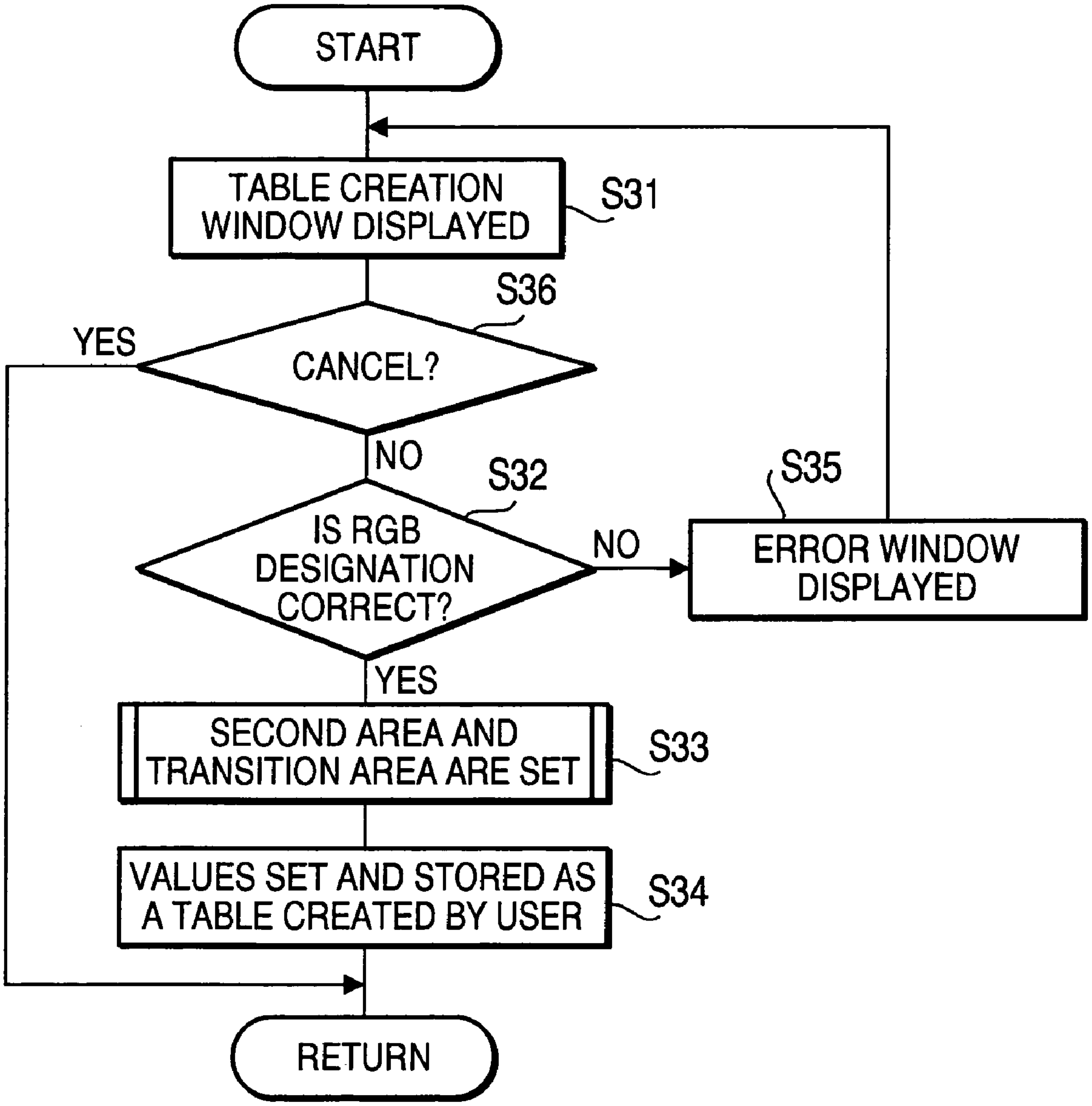

FIG. 26 is a flowchart illustrating a reference table creation procedure called in the RBG conversion table creating procedure shown in FIG. 25.

Figure 27:
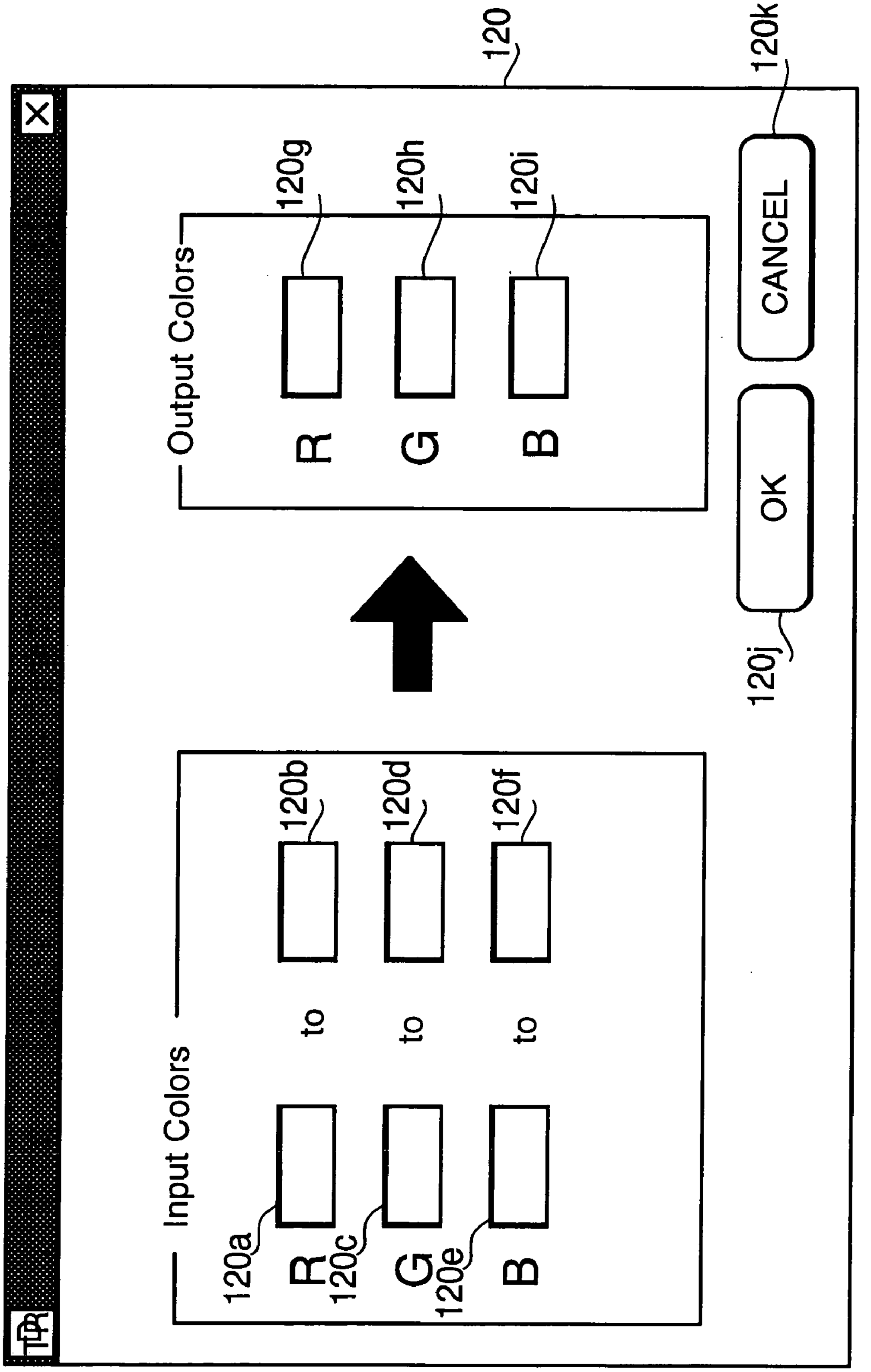

FIG. 27 shows an example of an RGB input window shown on a display.

Figure 28:
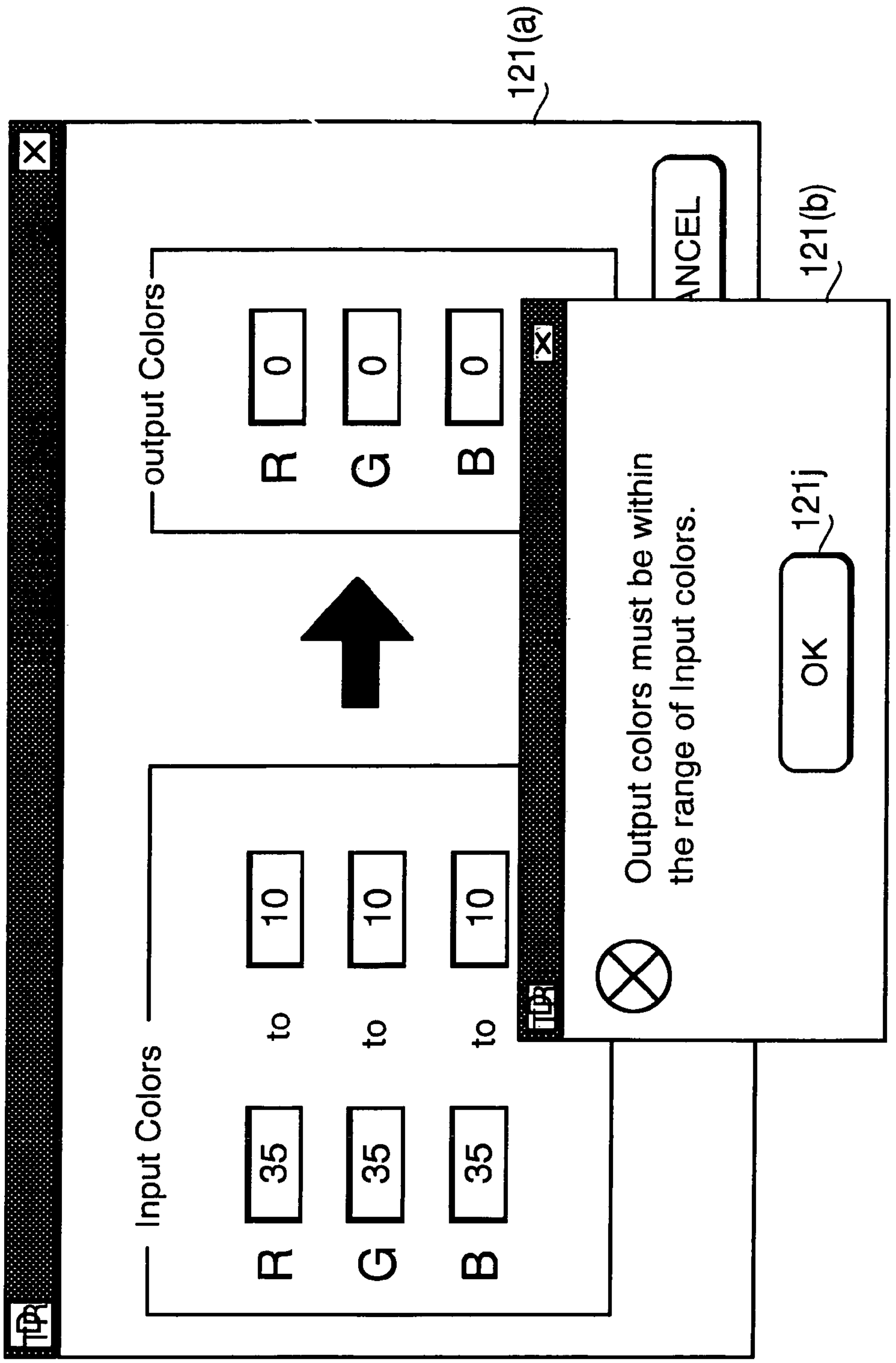

FIG. 28 shows a window shown on a display when an input error occurs.

Figure 29:
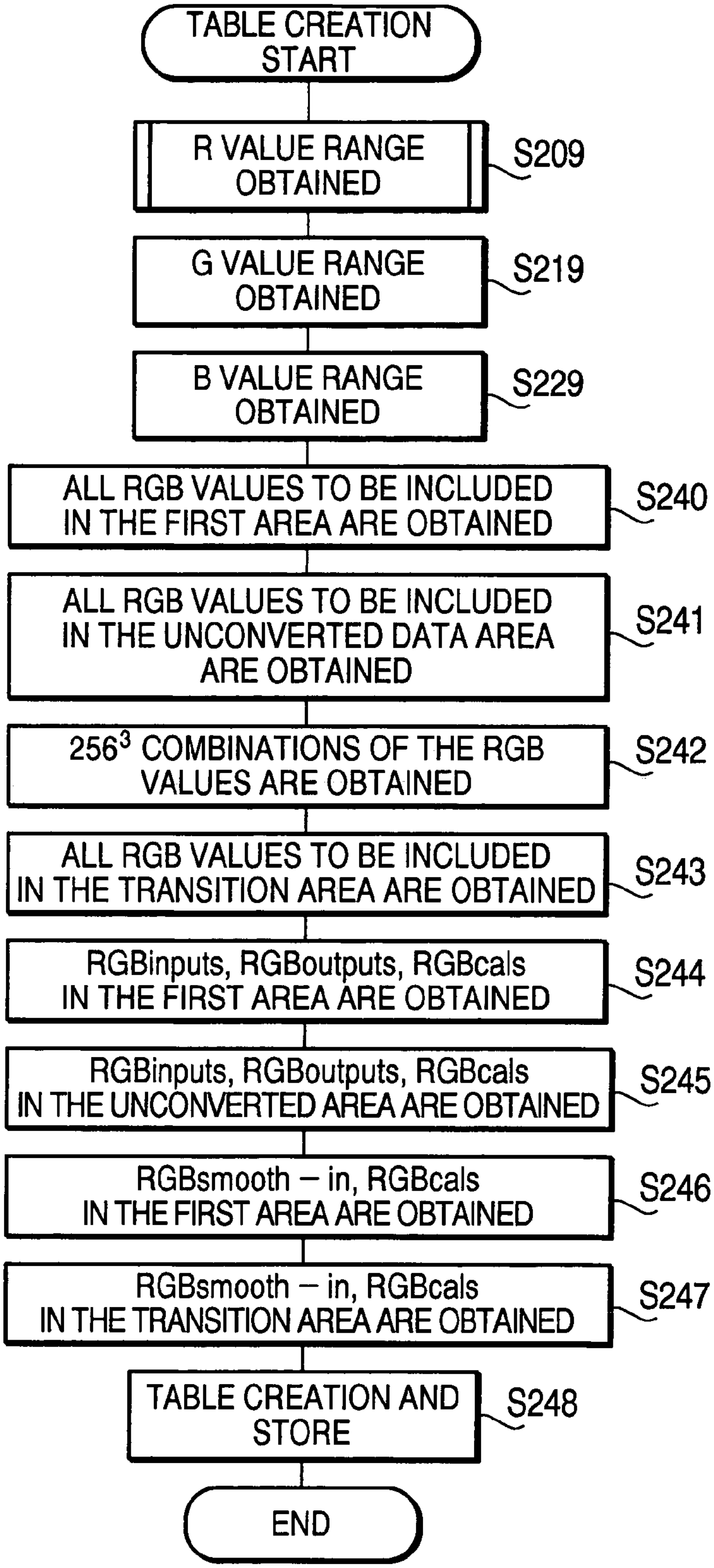

FIG. 29 is a flowchart illustrating a second area and transition area setting process called in the reference table creation procedure shown in FIG. 25.

Figure 30:
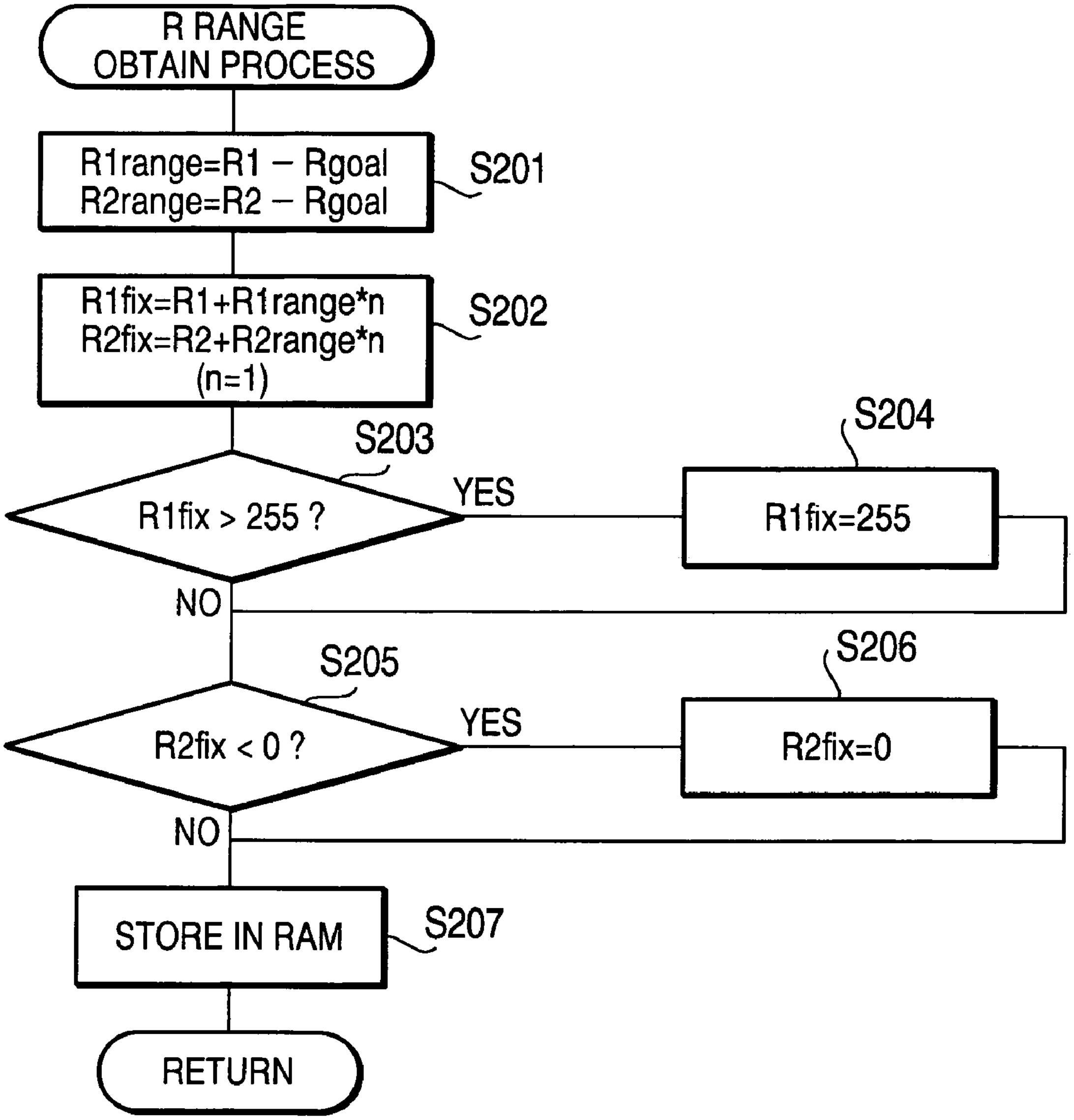
Figure 32:
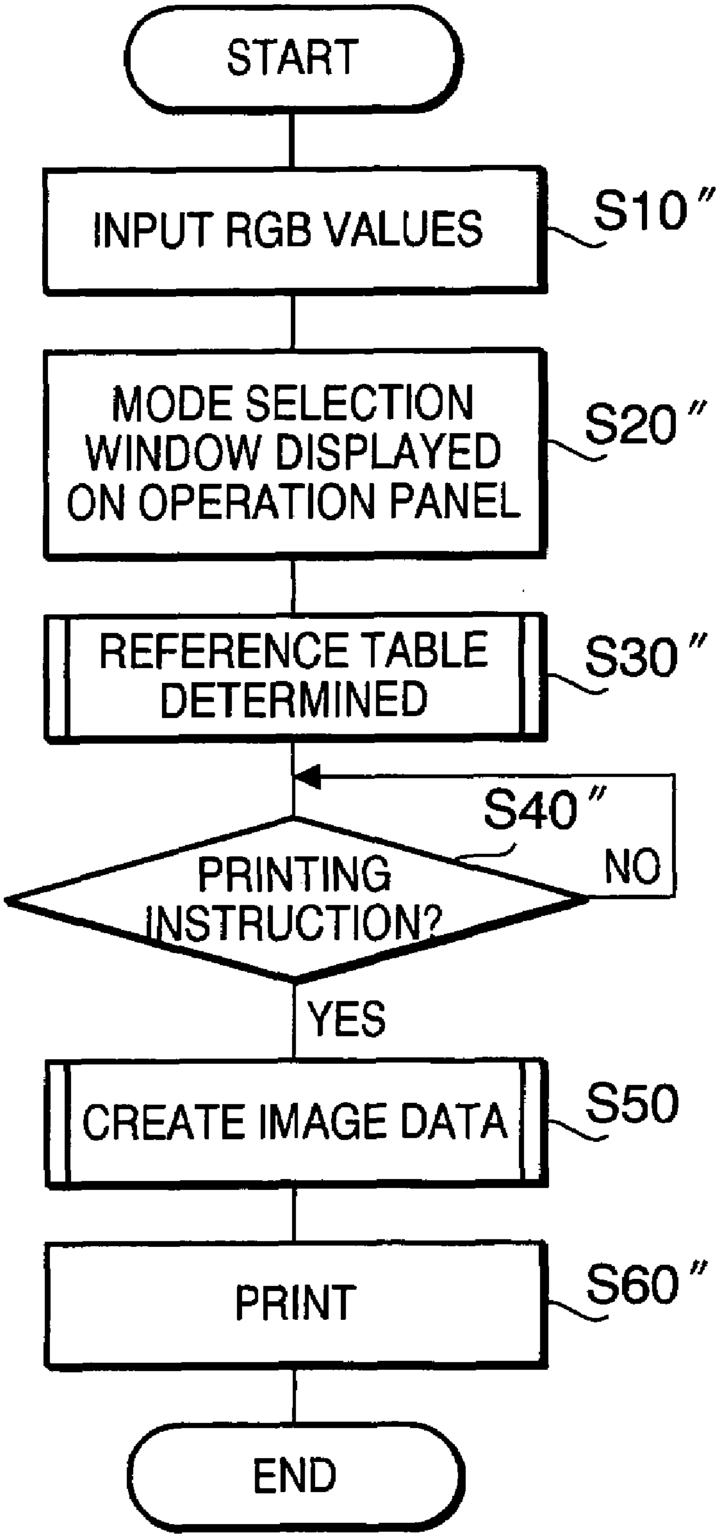

FIG. 30 is a flowchart illustrating an R range obtaining procedure called in the table creation procedure shown in FIG. 29 in detail;

FIG. 31 is an example of a reference table for an RGB conversion created by a user;

FIG. 32 is a flowchart illustrating an image processing procedure performed by a CPU of an image formation control system when the T-shirt printer performs vividness enhancement process to unconverted data;

DETAILED DESCRIPTION

General Overview

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

According to some aspects of the invention, an image formation control system including an input system that is adapted to input instruction signals concerning a vividness enhancement target color of image signals from a user, and a vividness enhancement processing system that is adapted to apply a vividness enhancement process by converting at least one first area of a color space concerning the image signals to a single vividness enhancement target color corresponding to each first area according to the instruction signals from the user input through the input system, and by determining a second area which is the remaining area of the color space wherein the vividness enhancement process is not applied is provided. The image signals processed with the vividness enhancement process are converted to output data for a printer.

Optionally, the vividness enhancement processing system may be provided with a transition processing system. The transition processing system may be adapted to convert the color space of the image signals in a part of the second area that may be closer to the first area to transition colors that may be set according to the vividness enhancement target color in the first area.

Optionally, the transition processing system may convert the color space of the image signals in the part of the second area that may be closer to the first area to the transition colors by interpolating chromatic coordinate values of the color space in the part of the second area.

Optionally, the input system may be adapted to input selection signals to select a desired mode from a plurality of mode that may be provided corresponding to a degree of the vividness enhancement process. The vividness enhancement processing system may determine at least two combinations of a range of at least one the first area and the second area, a size of at least one of the first area and the second area, a number of at least one of the first area and the second area, the vividness enhancement target color, and existence of a transition processing by the transition processing system according to the selection signal.

Optionally, the input system may be adapted to input selection signals to select non-processing mode, wherein no vividness enhancement process may be performed.

Optionally, the input system may be adapted to input instruction signals specified by the user regarding a range, size, and the vividness enhancement target color of the first area. The vividness enhancement processing system may include a judging system that may judge the second area excluding the first area based on information on the first area specified with the input system, and may determine at least two combinations of a range of at least one the first area and the second area, a size of at least one of the first area and the second area, a number of at least one of the first area and the second area, the vividness enhancement target color, and existence of a transition processing by the transition processing system according to the selection signal.

Optionally, colors in the first area may be located near the surface in a color system of an L*a*b* scheme.

Optionally, the vividness enhancement processing system may be adapted to set the first area and the second area in the color space by converting RGB values concerning the image signals, and convert the color space in the first area to the vividness enhancement target color.

Optionally, the vividness enhancement processing system may be adapted to set the first area and the second area in the color space by converting L*a*b* values concerning the image signals, and convert the color space in the first area to the vividness enhancement target color.

Optionally, the vividness enhancement processing system may be adapted to set the first area and the second area in the color space by converting CMYK values concerning the image signals, and convert the color space in the first area to the vividness enhancement target color.

According to another aspects of the invention, an image formation controlling method including an input process to input instruction signals concerning a vividness enhancement target color of image signals from a user, a vividness enhancement process to convert at least one first area of a color space concerning the image signals to a single vividness enhancement target color corresponding to each first area according to the instruction signals from the user input through the input process, and by determining a second area which is the remaining area of the color space wherein the vividness enhancement process is not applied is provided. The image signals which are applied with the vividness enhancement process are converted to output data for a printer.

According to another aspects of the invention, an image formation controlling method is provided. The image formation controlling method includes an input process to input image signals and instruction signals from a user concerning the image signals, a vividness enhancement process to convert at least one first area of a color space concerning the image signals to a single vividness enhancement target color corresponding to each first area according to the instruction signals from the user input through the input process, and by determining a second area which is the remaining area of the color space wherein the vividness enhancement process is not applied, and a process to print images based on the image signals which are applied with the vividness enhancement process.

According to another aspects of the invention, a recording media including a program to control a printing device by an image formation controlling method is provided. The image formation controlling method includes an input process to input image signals and instruction signals from a user concerning the image signals, a vividness enhancement process to convert at least one first area of a color space concerning the image signals to a single vividness enhancement target color corresponding to each first area according to the instruction signals from the user input through the input process, and by determining a second area which is the remaining area of the color space as a area wherein the vividness enhancement process is not applied, and a process to convert the image signals which are applied with the vividness enhancement process to output data for a printer.

According to another aspects of the invention, a recording media including a program to control a printing device is provided. The program is configured to perform an input process to input image signals and instruction signals from a user concerning the image signals, a vividness enhancement process to convert at least one first area of a color space concerning the image signals to a single vividness enhancement target color corresponding to each first area according to the instruction signals from the user input through the input process, and by determining a second area which is the remaining area of the color space as a area wherein the vividness enhancement process is not applied, and a process to print images which are applied with the vividness enhancement process.

According to a further aspect of the invention, there is provided a computer program allowing a computer to perform an image formation controlling process including the steps of inputting instruction signals concerning a vividness enhancement target color of image signals from a user, converting at least one first area of a color space concerning the image signals to a single vividness enhancement target color corresponding to each first area according to the instruction signals from the user input and determining a second area which is the remaining area of the color space wherein the vividness enhancement process is not applied, and outputting the image signals which are applied with the vividness enhancement process as output data for a printer.

First Embodiment

Hereinafter, referring to the accompanying drawings, an image formation controlling device according to an embodiment of the invention will be described.

Figure 1:
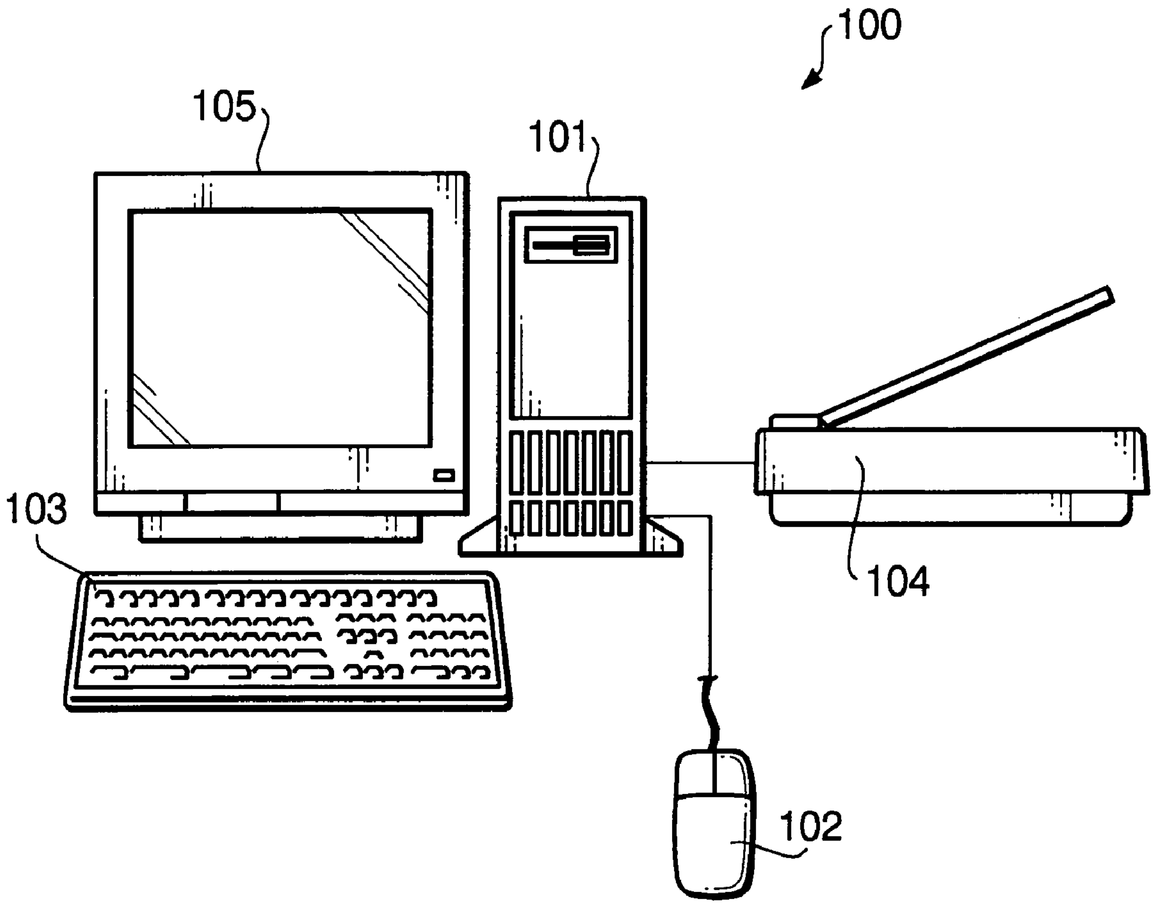
FIG. 1 is a front view of an image formation control system according to an embodiment of the invention.

FIG. 1 is a front view of an image formation controlling system 100 according to an embodiment of the invention. The image formation controlling system 100 includes a main device 101, a mouse 102 and a keyboard 103 that are connected to the main device 101, an image scanner 104 and a display 105. The image formation controlling system 100 controls a printing operation of a printer 1 (see FIGS. 2 and 3) to print images on a fabric (e.g., a T-shirt TS) by generating and outputting print data, which is transmitted to the printer 1.

Figure 2:
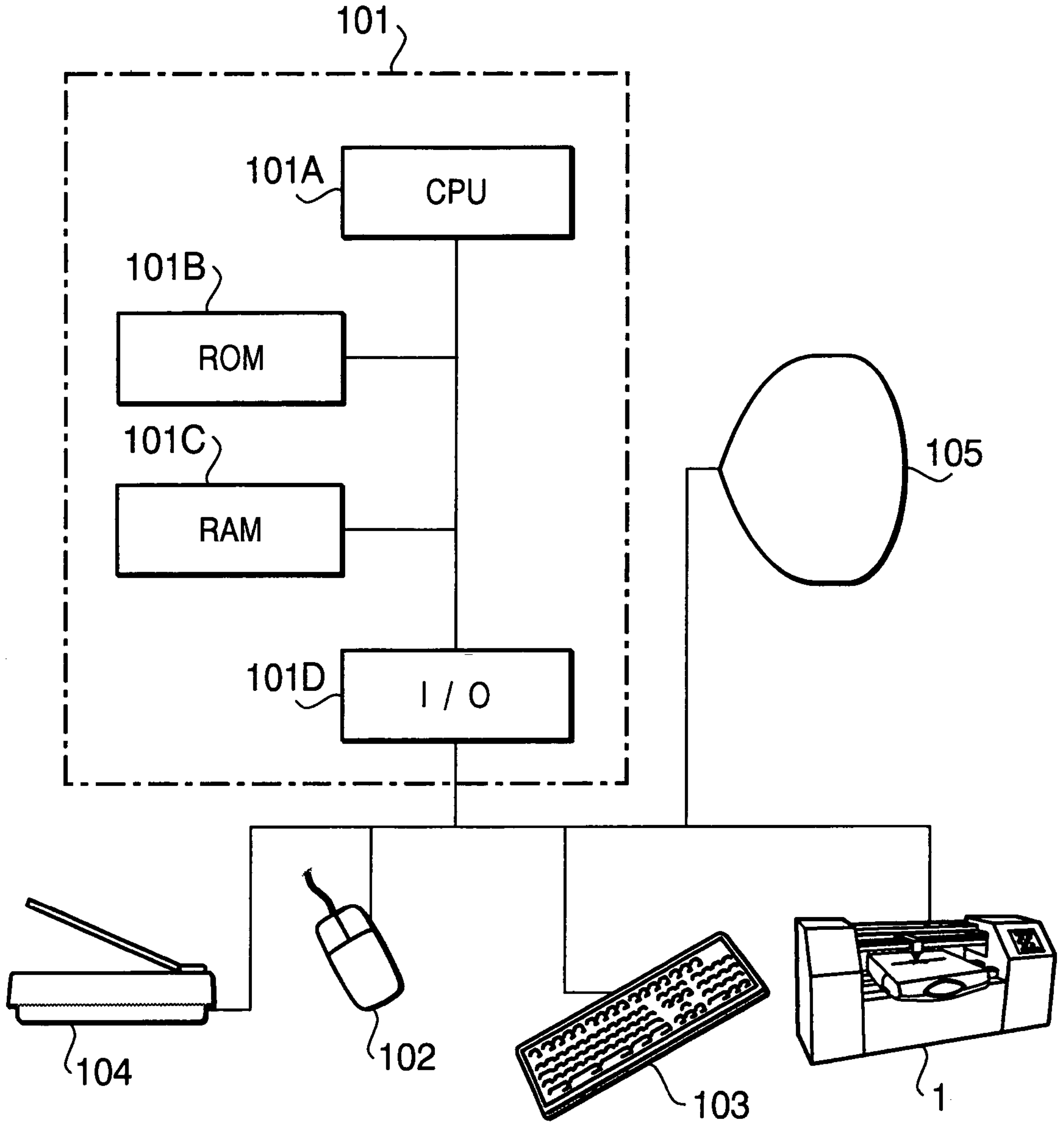
FIG. 2 is a block diagram showing a functional configuration of the printing system shown in FIG. 1.

FIG. 2 is a block diagram showing a functional configuration of the image formation controlling system 100 shown in FIG. 1. The main device 101 is provided with a CPU 101A that controls an entire operation of the image formation controlling system 100, a ROM (Read Only Memory) 101B that stores a controlling program (i.e., a printer driver) enabling the CPU 101A to perform an image formation controlling method according to the embodiment, a RAM (Random Access Memory) 101C that temporarily stores various data including results of operation carried out by the CPU 101A, and an I/O interface 101D that controls input and output of signals transmitted among the CPU 101A, the RAM 101, the mouse 102, the keyboard 103, the image scanner 104, the display 105 and the T-shirt printer 1. It should be noted that some of the components (e.g., the display 105) may be connected to other components (e.g., the CPU 101A, the RAM 101, etc.) only through the I/O interface 101D, or may be connected through another device, such as a signal converting device or the like.

FIG. 3 is a perspective view of the T-shirt printer 1 to be controlled by the image formation controlling system 100. FIG. 4 shows a front view of main components of the T-shirt printer 1. FIG. 5 is a side view of the T-shirt printer 1 in which main components are indicated by broken lines. In the following description, the left-hand side of FIG. 5 will be referred to as a front side of the T-shirt printer 1 and the upper direction in FIG. 5 will be referred to as an upper direction of the T-shirt printer 1.

As viewed in FIGS. 3, 4 and 5, the T-shirt printer 1 is provided with a frame 2, a casing 3, a guide rail 4, a carriage 5, inkjet heads 6, a carriage motor 7, a pulley 8, a carriage belt 9, a platen driving mechanism 10, cartridge accommodating units 12, a purge unit 14, and an operation panel 40.

The frame 2 has a horizontal frame 2*h* placed on a bottom surface of the casing 3 and vertical frames 2*v* arranged upright at both ends of the horizontal frame 2*h*. The casing 3, which is drawn by two-dotted line lines in FIG. 4, accommodates and protects the inner components of the T-shirt printer 1. The guide rail 4 is provided horizontally to connect the upper ends of the vertical frames 2*v*. The carriage 5, having an approximate rectangular parallelepiped shape, is driven to move in a longitudinal (horizontal) direction as guided by the guide rail 4. On the bottom surface of the carriage 5, four piezoelectric inkjet heads 6 are provided. The carriage motor 7 is provided in the vicinity of the left-hand side end of the guide rail 4. The pulley 8 is provided in the vicinity of the right-hand side end of the guide rail 4. The carriage belt 9 is provided between the carriage motor 7 and the pulley 8 at a level slightly below the guide rail 4. The carriage belt 9 is fixed to a back surface of the carriage 5. As the carriage motor 7 is driven, the carriage belt

9 reciprocates, thereby moving the carriage 5 in the longitudinal direction of the guide rail 4.

The platen driving mechanism 10 is provided above the horizontal frame 2*h*. Inside the casing 3, on outer surfaces of the vertical frames 2*v*, the cartridge accommodating units 12 are provided. Each cartridge accommodating unit 12 accommodates detachable ink cartridges that contains color ink. The purge unit 14 is provided at a location corresponding to the carriage 5 when located at the right-hand side end position of the guide rail 4, and is provided with suction caps 13 that are detachably coupled to the nozzles of each inkjet heads 6. An operation panel 40 allowing the user to operate the T-shirt printer 1 is provided at the upper right-hand side outer surface of the casing 3.

The inkjet heads 6 are provided to four colors of ink, for example cyan, magenta, yellow and black ink, respectively. Each of the inkjet heads 6 is provided with a plurality of (e.g., 128) channels to eject ink. Further, for each ink channel, a piezoelectric actuator (not shown) is provided. The piezoelectric actuators are driven independently from each other. With this structure, by controlling the piezoelectric actuators, liquid droplets of the ink are ejected downward from minute nozzles (not shown), which are formed correspondingly to the channels at bottom surfaces of the inkjet heads 6.

Each of the cartridge accommodating units 12 is adapted to accommodate two ink cartridges 11. The ink cartridges 11 are connected to the inkjet heads 6 through tubes (not shown), respectively, and through the tubes, the ink in each ink cartridge 11 is supplied to each channel.

The purge unit 14 is provided with a suction pump (not shown). When the suction caps 13 closely contact the inkjet heads 6, waste ink can be sucked, through the suction caps 13, from the inkjet heads 6, respectively. In addition, the suction caps 13 cover the nozzles of the inkjet heads 6 when printing is not performed and the inkjet heads 6 are located at positions shown in FIG. 4 so as to prevent the ink on the nozzles from being dried.

The platen driving mechanism 10 is provided with bases 35 and 35 standing at the front side end of the horizontal frame 2*h*, and bases 36 and 36 standing at the rear side end of the horizontal frame 2*h*. The top of the bases 35, 35 and the bases 36, 36 are substantially on a same plane and located at apexes of a rectangle assumed on the plane. Further, at the upper end portions of the bases 35 and 35, pulleys 28 and 28 are provided, respectively, and at the upper end portions of the bases 36 and 36, pulleys 29 and 29 are provided, respectively. Endless belts 27 and 27 are wound around the two pairs of the pulleys 28 and 29, respectively. Above the endless belts 27 and 27, platen rails 26 and 26 are arranged, respectively. Further, a plate-like sliding base 23 having a substantially rectangular shape is secured to the endless belts 27 and 27 with fixing pieces 24 and 24. On the sliding base 23, a supporting pole 21 stands upward, which supports a platen 20.

The platen 20 is used to print an image on a body part of the T-shirt TS. The platen 20 is a rectangular plate member. The platen 20 is arranged such that a surface facing the inkjet heads 6 is parallel to paths of the reciprocal movement of the inkjet heads 6. When printing is performed, the T-shirt TS is placed on the platen 20 to covered the same, and the surface of the T-shirt TS is flattened along the surface of the platen 20. As the platen motor 25 is actuated to drive the endless belts 27 and 27 via the pulleys 29 and 29 secured to the output shafts of the platen motor 25, the platen 20 reciprocates along the platen rails 26 and 26 in the front/rear direction (i.e., a direction perpendicular to a plane of FIG. 1) of the T-shirt printer 1, as the driving force of the platen motors 25 is transmitted through the fixing pieces 24, the sliding base 23, the supporting pole 21. The inkjet heads 6 are mounted on the carriage 5 and reciprocate, along the guide rails 4, in a right-and-left direction of the T-shirt printer 1 as the carriage motor 7 is driven. As a result, when a printing operation is carried out, the inkjet heads 6 can be moved in front/rear and right/left directions relative to the T-shirt TS, since the platen 20 can be moved in the front/rear direction, while the inkjet heads 6 can be moved in the right/left direction. Therefore, a desired two-dimensional image can be formed on a desired position on the T-shirt TS placed on the platen 20.

FIG. 6 is a block diagram showing an electrical configuration of the T-shirt printer 1. In FIG. 6, a control unit 80 is indicated in addition to the operation panel 40.

The control unit 80 is provided with a CPU 81, a ROM 82, a RAM 83, a head driving unit 84, a motor driving unit 85, a display controlling unit 87, an input sensing unit 88, a sound controlling unit 89 and a communication controlling unit 90, which are interconnected through a bus 86. The CPU 81 controls the entire operation of the T-shirt printer 1. The ROM 82 stores various information including control programs executed by the CPU 81. The RAM 83 temporarily stores data necessary for operations. The head driving unit 84 is adapted to drive the piezoelectric actuators provided to the inkjet heads 6. The motor driving unit 85 is adapted to drive the carriage motor 7 and the platen motor 25. The display controlling unit 87 controls a display 41, which is provided on the operation panel 40, to display images and indicator lamps 42. The input sensing unit 88 is adapted to receive signals input in response to operations of various operation buttons 43 that are provided on the operation panel 40. The sound controlling unit 89 is adapted to control a speaker 44, which is also provided on the operation panel 40, to output various sounds. The communication controlling unit 90 is adapted to control the T-shirt printer 1 to communicate with the main device 101 of the image formation controlling system 100.

With the configuration described above, when a desired image (i.e., an original image) is printed on the surface of the T-shirt TS, at least one area (which will be referred to as a first area) of a color space is specified by an instruction from the user, and is converted to a single vividness conversion target color, while, in the remaining area (a second area), no conversion of the color is made. The above process will be referred to as a vividness conversion process. With this vividness conversion process, the property of "vigorous and sharp-contrasted", "clear and vivid", "unclouded and high-colored", which are required for images printed on the fabric can be formed.

Hereinafter, the vividness conversion process will be described in detail.

When an image is printed on the fabric such as the T-shirt, unlike a case where an image is formed by office printers or photograph printers, "vividness", "vigorous" or "characteristic using plastisol ink" is generally preferred.

An ordinary user who is not highly skilled in digital printing may not obtain such a desired characteristic merely by capturing an image using a scanner or a digital camera, applying well-know image processing such as brightness adjustment, hue adjustment and the like, creating print data using a printer driver, and printing the thus processed image.

First, a reason why the desired image quality cannot be achieved will be described when an image of a hand-drawn sketch (e.g., pencil-drawn sketch or watercolor painting) or printed material is captured using a scanner.

If a printed material (e.g., a pamphlet) is read using an image scanner to generate image data, which is printed as it is, letters which appears black on the original may have a color (i.e., the brightness is raised) on the printed image, depending on the scanning characteristic of the scanner.

FIG. 7A is an image created by capturing a printed material with a scanner. FIG. 7B is an enlarged view of an area A of the image shown in FIG. 7A, and FIG. 7C is another enlarged view of an area B of the image shown in FIG. 7A.

On the original printed material, the image of the alphabet letters "ColorSymphony" shown on top (see FIG. 7B) and smaller Chinese characters shown at the bottom (see FIG. 7C) appear to be intense black. In the printed image (i.e., image scanned and then printed), the letters "ColorSymphony" remains to appear close to the original color (i.e., intense black). That is, at the center of a line forming a letter, the RGB values of the image data are R=G=B=0, while at an outline of each letter, R=9, G=11 and B=15. The Chinese characters appear to have brighter black (less intense black), as shown in FIG. 7C, in the printed image.

It should be noted that the colors other than black portions have also changed similarly. In particular, however, if the darkest color, black does not appear as dark as the original color, the entire image appears to be an indistinct image, which is not a vivid, vigorous or tight image, which may not be suitable for an image to be printed on a T-shirt.

A sketch drawn with black or color pencils will be easily affected by the color of paper and/or characteristic of the scanner. Thus, such a sketch tends to become faint if scanned. FIG. 8 is another example of an image, originally drawn in a black pencil, printed by the printer after being scanned by a scanner. When images drawn in pencils are printed, the images tend to become even more faint than images created from printed materials. It should be noted that the output image shown in FIG. 8 appears to be flat, lacks vigorousness, and may not be suitable for a T-shirts.

Problem Due to Difference of Color Spaces

Generally, on a display such as a CRT display or an LCD, images are reproduced by color additive mixing of RGB (red, green, and blue), while images in a printer are reproduced by color subtractive mixing of CMYK (cyan, magenta, yellow, and black). Therefore, when a plurality of colors are mixed, a subtle difference may occur between the displayed images and printed images due to the difference of color spaces. Further, colors displayed on a display are generally greater in coverage of reproductive range than colors reproduced by a color printer, and it is normally difficult for a printer to reproduce certain colors which can be reproduced on the display. Therefore, when images with such colors (which cannot be normally printed) are to be printed, a color space is compressed to match the images (i.e., color matching process) displayed on the display by utilizing color profiles (i.e., LUT: lookup table). Due to these factors, colors in the displayed images and the printed images may appear different.

FIG. 9A is an example of a black color reproduced in CMYK (C=0, M=0, Y=0, K=100). When this black is converted to RGB scheme according to a general profile, the color is reproduced as, for example, R=55, G=53, B=54 (see FIG. 9B), while a plain black in The RGB scheme, however, is reproduced as R=0, G=0, B=0 (see FIG. 9C), that is, no light is provided. Therefore, it should be noted that the black shown in FIG. 9B should appear to be brighter (rather reddish charcoal gray) compared to the black shown in FIG. 9C. This appearance difference is due to processing functions of graphic applications and the profile processes described above. As a result, a black image reproduced by a printer tends to become reddish charcoal gray as specified in the RGB scheme, which may result in a less tight and less vigorous image.

Principle

In view of the above described shortcoming, in the present embodiment, a conversion process is applied to image data created. In the process, color data values (in The RGB scheme) of the capture image (i.e., input image data) are converted so as to appear vivid on printed media according to a predetermined conversion table. Specifically, in contrast to the conventional color matching process in which the maximum color reproduction is intended among different color areas, every blackish dark color, for example data of which RGB values are (R=10, G=14, B=19) and (R=27, G=19, B=26), is converted to the intense black (i.e., a single target color), whose RGB values are R=0, G=0, B=0 (which will be referred to as the vividness process).

Image Information Control System

An embodiment of image printing control in the image formation controlling system 100 according to an illustrative embodiment of the invention will be described in detail below. In this embodiment, the image formation controlling system 100 uses the RGB scheme as input values of image data (i.e., the captured image data represents the RGB data).

FIG. 10 is a flowchart illustrating an image formation procedure executed by the CPU 101A of the main device 101 of the printing system 100. In S10, RGB values of a desired image to be printed on a T-shirt TS are obtained. The image data may have been stored in a hard disk drive (not shown), in advance, which may be retrieved with an operation by a user using an input device for example the keyboard 103 or the mouse 102. Alternatively or optionally, the image data may be input through a communication means such as the Internet. Still alternatively or optionally, the image data may be captured using the scanner 104 or an external device such as a digital camera (not shown).

In S20, the control displays a plurality of process modes, which are prepared for the vividness enhancement process, for selection by the user. More specifically, the control generates display signals and transmits the display signals to the display 105. The display 105 displays the mode selection screen so that the user can select one of the plurality of modes.

FIG. 11 shows an example of the mode selection window 110 displayed on the display 105. On the left-hand side of the mode selection window 110, various buttons corresponding to the plurality of modes are provided.

A "monitor matching" button 110*a* is provided to select a monitor matching mode, wherein no vividness enhancing process is executed. A "photograph" button 110*b* is provided to select a photograph mode, which corresponds to a processing for normal photograph and a relatively light vividness enhancement effect is applied (i.e., the degree of vividness is relatively low). A "graphic" button 110*c* is provided to select a graphic mode, wherein a relatively moderate effect is obtained (i.e., the degree of vividness is medium). The "vivid" button 110*d* is provided to select a vivid mode, wherein the most intensive vividness effect is applied. It should be noted that the references to the modes are not necessarily limited to those described above, wherein the mode names are defined based on a usage of the output image. For example, the mode names may be defined by the degree of vividness obtained. An example of such mode names are "original", "soft", "clear", "vivid", "strong" and "heavy". Alternatively, the degree of vividness enhancement may be indicated by numbers.

At a lower right portion of the mode selection window 110, an "OK" button 110*e* and a "Cancel" button 110*f* are provided.

Referring back to FIG. 10, when one of the modes is selected, the process proceeds to S30. In S30, a reference table, which is previously set and stored in the main device 101 to be referred to for conversion of the RGB values (i.e., the vividness enhancement process) corresponding to each mode, is determined.

FIG. 12 is a flowchart illustrating a reference table determining procedure called in S30. In S2031, the process judges whether the monitor matching mode is selected by the user (i.e., whether the "OK" button 110*e* has been operated by the user after the user has selected the "monitor matching" mode button 110*a*. If the user specifies the monitor matching mode button 110*a* at the window 110 and presses the "OK" button 110*e*, the process proceeds to S2032. In S2032, Table 1 (see FIG. 13A) is determined to be used as the reference table for the RGB conversion. If the monitor matching mode is not selected (S2031: NO), the process proceeds to S2033.

In S2033, the process judges whether the photograph mode is selected. If the photograph mode is selected, i.e., if the user specifies the photograph mode button 110*b* at the window 10 and presses the "OK" button 110*e* (S2033: YES), the process proceeds to S2034. In S2034, Table 2 (see FIG. 13B) is specified as the reference table for the RGB conversion. If the monitor matching mode is not selected (S2033: NO), the process proceeds to S2035.

In S2035, it is judged whether the graphic mode is selected. If the graphic mode is selected, i.e., if the user specifies the graphic mode button 110*c* at the window 110 and presses the "OK" button 110*e* (S2035: YES), the process proceeds to S2036. In S2036, Table 3 (see FIG. 14A) is specified as the reference table for the RGB conversion. If the monitor matching mode is not selected (S2035: NO), the process proceeds to S2037.

In S2037, the process judges whether the vivid mode is selected. If the vivid mode is selected, i.e., if the user specifies the vivid mode button 110*d* at the window 110 and presses the "OK" button 110*e* (S2037: YES), the process proceeds to S2038. In S2038, Table 4 (see FIG. 14B) is specified as the reference table for the RGB conversion. If the monitor matching mode is not selected (S2037: NO), the process returns to S2031 and repeats the processes described above.

After S2032, S2034, S2036, or S2038, the process proceeds to S2039 to judge whether the once selected process mode is canceled or not. If the user depresses the "Cancel" button 110*f* after specifying one of the modes (S2039: YES), the process returns to the S2031 and repeats the processes described above. If the "Cancel" button 110*f* is not pressed (S2039: NO), the process finishes the routine shown in FIG. 12 and proceeds to S40 shown in FIG. 10. In S40, the RGB values captured in S10 are converted by referring to one of the tables (Table 1-Table 4) determined in steps S2031 through S2039.

FIGS. 13A, 13B, 14A and 14B are the RGB conversion tables respectively corresponding to the monitor matching mode, the photograph mode, the graphic mode, and the vivid mode. In each table, a left column shows the original RGB values (input RGB values), a central column shows subtracting values, and a right column shows converged RGB values.

Each color of red (R value), green (G value), and blue (B value) is divided into 256 chromatic graduation from 0 to 255. In each table, as shown in FIGS. 13A, 13B, 14A and 14B, for all the combinations of R, G and B values (i.e., $256^3$ color coordinate values), corresponding subtracting values are defined. By subtracting the corresponding subtracting values from the original (input) RGB values (i.e., the values corresponding to the image captured at S10), the converged RGB values are calculated. The vividness enhancement target color (e.g., black, white, red or the like) has RGB values, each of which (R, G and B values) is represented by value within a range from 0 to 255, and at least one of which (R, G or B component) has a value of 0 or 255. The vividness enhancement target value is set within the first area.

In the monitor matching mode, no vividness enhancement process is executed. Therefore, for all the $256^3$ combinations of the original (input) RGB values, the subtracting values (R, G, B) are (0, 0, 0). The RGB values of the image captured in S10 are output as they are as the converted values. In other words, no conversion is executed.

In the photograph mode, relatively moderate vividness enhancement effect is obtained. In this mode, relatively small original RGB values ($0 \leqq R \leqq 12$, $0 \leqq G \leqq 14$, $0 \leqq B \leqq 19$; hereinafter a range of the RGB values will be described in the RGB color coordinate, such as (0, 0, 0)-(12, 14, 19)) are in the first area (which is relatively close to black), and are converted to the single vividness enhancement target color (0, 0, 0), which is the intense black, by subtracting the subtracting values which are the same values as the input RGB values.

The other input RGB values ((13, 14, 19)-(255, 255, 255) in the RGB color coordinate) that are not included in the first area are set as the second area, wherein the vividness enhancement process is not executed in this area. In the second area, the subtracting values for a range in which the input RGB values are relatively large ((35, 38, 34)-(255, 255, 255) in the RGB color coordinate) are all set to (0, 0, 0). Thus, the above area, (35, 38, 34)-(255, 255, 255) will be an unconverted area. The remaining area in the second area ((13,14, 19)-(35, 37, 34) in the RBG color coordinate) is set as a transition area to smoothly interpolate the colors in the first area and the unconverted data area.

FIG. 14A is a table for the RGB conversion provided to the graphic mode. In the graphic mode, a moderate vividness enhancement effect is obtained. In the graphic mode, for the first range, relatively small input RGB values ((0, 0, 0)-(55, 52, 54) in the RGB color coordinate), which range is wider than that of the photograph mode in the brighter side, are all converted to (0, 0, 0). In the unconverted data area of the second area in which the input RGB values are relatively large ((70, 72, 71)-(255, 255, 255) in the RGB color coordinate), where the darker side is narrower than that of the photograph mode, the input RGB values are uses as the converted RGB values as they are. That is, in the above range, the subtracting values are (0, 0, 0). The remaining area in the second area ((56, 53, 54)-(70, 71, 71) in the RGB color coordinate), which is an area connecting the first area and the original area, constitute a transition area to interpolate the color spaces of the first area and the second area.

FIG. 14B is an RGB conversion table for the vivid mode. In the vivid mode, the most intensive vivid enhancement effect is obtained. In this mode, the RGB values in the first area, in which the input RGB values are relatively small ((0, 0, 0)-(71, 72, 71) in the RGB color coordinate: the range is wider than that of the graphic mode on the brighter side), are set to (0, 0, 0). In the original data area ((89, 89, 91)-(255, 255, 255) in the RGB color coordinate: the are is narrower that that in the graphic mode on the darker side), the input RGB values are used, as they are, as the converted RGB values. An area connecting the first area and the original data area ((72, 72, 71)-(89, 89, 91)) constitutes a transition area that smoothly interpolate the color spaces of the first area and the second area.

It should be noted that the first area in any of the photograph mode, the graphic mode, or the vivid mode is an area includes colors that are relatively close to the intense black, which has the RGB values of (0, 0, 0). These colors in the first area are located near the surface in the color system of the L*a*b* scheme defined by CIE (Commission International de l'Eclairage).

Further, as shown in FIGS. 13A, 13B, 14A and 14B, the subtracting values need not be provided to every color coordinate value of $256^3$ combinations. Rather, the conversion table (i.e., the subtracting values) may be provided for the RGB values that fall into the first area and the transition area, which may substantially affect the image quality. Further, the tables may be retrieved from an external device through a network. Furthermore, the tables may not be provided in the form of the table but may be stored in the form of functions or the like. Further, the structure of the table need not be limited to the above-described one, but may have a different format. For example, the table may not have the subtraction values corresponding to the input color coordinate values, but may be simply configured to have input RGB color coordinate values output (i.e., converted) RGB values.

FIGS. 15A and 15B are charts illustrating processes of color transition of the interpolating. The horizontal axis indicates a distance from a vividness enhancement target value before a conversion, while the vertical axis indicates a distance from the vividness enhancement target value after the conversion.

As shown in the FIG. 15A, when the vividness enhancement process is not executed, the RGB values before a conversion and those after the conversion are equivalent, and appear to be in the diagonally right up dashed line starting from 0, with the inclination of 1.

When the vividness enhancement process is executed, the RGB values are divided into a first area, wherein the vividness enhancement target values are 0, and an unconverted data area, wherein the distance from the vividness enhancement target value before a conversion is equivalent to the distance from the vividness enhancement target value after the conversion, in addition to the transition area, wherein the RGB values are gradually interpolated between the first area and the unconverted data area.

The first area set in the photograph mode is greater than the first area of the monitor matching mode, as shown in FIG. 15B. Further, the first area in the graphic mode is greater than that of the photograph mode, and the first area in the vivid mode is greater than that of the graphic mode (widened to the right in the FIG. 15B). Correspondingly, the unconverted data area becomes smaller as the first area becomes greater the mode is transited from the monitor matching mode to the vivid mode (narrowed in the left in the FIG. 15B). Further correspondingly, the color range of the transition area varies. It should be noted that the inclinations of the lines indicating each transition area may not necessarily become greater as the mode is transited from the monitor matching mode to the vivid mode, but may be the same, or two of the lines may have the same inclination and the other two may have different inclinations. Each inclination should be set previously based on a desired visual transition effect.

Further it should be noted that the color transition process is not limited to interpolating as described above, but may be altered to another method, as long as he first area and the unconverted data area are visually smoothly connected to each other. Also, other interpolation with suitable calculation, for example linear or non-linear interpolation, volume interpolation or smoothing using adjoining RGB values, may be implemented. Furthermore, even calculation for interpolation may not be necessary, but suitable RGB values may be manually input, for example based on a scanned results of a printed material.

Referring back to FIG. 10, when the reference table for the RGB conversion is determined in S30, the process proceeds to S40. In S40, whether a printing instruction, which is signals input by using an input device for example the key board 103 and the mouse 102, is input by the user through the I/O interface 101D is determined. If the instruction is determined to have been input, the process proceeds to S50.

In S50, an image data for substantial printing is created based on the reference table determined in S30.

FIG. 16 is a flowchart illustrating an image processing procedure S50 in detail. In S51, the RGB values in the original image are converted using the reference table determined in S30. Thereafter, in S52, color matching is performed to the converted RGB values by referring to the LUT, which is provided to either the T-shirt printer 1 (in the control unit 8, for example) or the main device 101. With this procedure, the converted RGB values are again converted to another RGB values that corresponds to the color range of the T-shirt printer 1. After the color matching procedure, the process proceeds to S53.

In S53, the RGB values converted in S51 and S53 are converted to CMYK values (i.e., black generation). FIG. 17 is an example of a black generation table, a table for RGB-CMYK conversion in the black generation procedure. Referring to the table shown in FIG. 17, the RGB values reproduced by color additive mixing are converted to CMYK values reproduce by color subtractive mixing. In the table, there are provided $256^3$ combinations of the CMYK chromatic coordinate values (from (0, 0, 0, 100) in the top row of the CMYK column to (0, 0, 0, 0) in the bottom row), each of which corresponds to the $256^3$ combinations of the RGB chromatic coordinate values (from (0, 0, 0) in the top row of the RGB column to (255, 255, 255) in the bottom row), so that the RGB values are sequentially converted to the CMYK values. It should be noted that the black generation table and the LUT which is referred to in S52 may be integrated so that S52 and S53 are performed in one step.

Referring back to FIG. 16, when S53 is completed, the process proceeds to S54. In S54, the CMYK values obtained in S53 are converted to binary data so that the colors are reproduced with color ink through the inkjet heads 6 of the T-shirt printer 1. In this step, each CMYK value is converted to a control signal, final output data to print the image, to drive piezoelectric actuators that controls ink emission from the nozzles of each inkjet heads 6. The method to drive nozzles with piezoelectric actuators are known in the prior art, therefore, specific description should be omitted.

If S54 is completed, the process terminates the routine and proceeds to S60 shown in FIG. 10. In S60, the binary data converted in S50 are transmitted to the communication controlling unit 90 of the T-shirt printer 1 through the I/O interface 101D. Thereafter, the flow is completed.

The transmitted binary data are stored in the RAM 83 of the T-shirt printer 1. When the T-shirt TS as a printing medium is set with the front surface upward on the platen 20, printing is started. By an operation through suitable means, for example a "print start" button, on the operation panel 40, the CPU 81 drives the piezoelectric actuators of the inkjet heads 6, the carriage motor 7, and the platen motors 25 through the head driving unit 84 and the motor driving unit 85 based on the binary data stored in the RAM 83.

It should be noted that in the process described above, the I/O interface 101D corresponds to the input system that is adapted to input instruction signals concerning the vividness enhancement target color of image signals from a user.

Also it should be noted that S30, S50 shown in FIG. 10, and S51 shown in FIG. 16 in the flow which is executed by the CPU 101A correspond to the vividness enhancement method, wherein a color space of image signals in a first area is converted to a vividness enhancement target color according to instruction signals from the user input through the input system, and a color space of the image signals in a different area from the first area remains unconverted. Further, converting the color space by referring to Table 2 shown in FIG. 13B, Table 3 shown in FIG. 14A, and Table 4 in FIG. 14B with a transition area being provided between the first area and an unconverted data area corresponds to the transiting method, wherein the color space of the image signals in a part of the second area closer to the first area are converted to transition colors that are set based on the vividness enhancement target color in the first area.

In the conversion method described above, when the RGB values in the first area are converted, a plurality of blackish colors in the first area which are different from each other are converted to a single plain black, which is specifically effective to obtain an image with sharp, vivid, clear, and fresh appearance on fabrics.

FIG. 18A is an example of a printed material that are not applied with a vividness enhancement process, while FIG. 18B is another example of the printed material that are applied with a vividness enhancement process, for example in the vivid mode, and printed with the T-shirt printer 1.

As shown in FIG. 18B, the alphabet letters in black are printed with sharper and clearer outlines than the letters shown in FIG. 18A, thus the entire image appears to be more vivid with strong contrast.

In the image formation controlling system 100 according to an illustrative embodiment of the invention, the color space of the image signals in the transition area is converted to transition colors that are based on the vividness enhancement target color in the first area. With this conversion method, a staged color transition (i.e., an pseudo-outline) near a border between the colors in the first area and the second area can be prevented from occurring. Thus, the colors in the first areas and the colors in the unconverted data area are visually smoothly connected to each other.

Further, in the image formation controlling system 100, the vividness enhancement process according to a selection from a user is automatically executed by selecting a desired mode shown on the display 105. This is specifically effective for those users, for example, who are not skilled in digital printing, and those who are not familiar with using image retouch application for printing, as desired images, for example captured with a scanner a digital camera, can be readily printed by selecting a desired mode for printing.

Furthermore, the image formation controlling system 100 is provided with the monitor matching mode, wherein no vividness enhancement process is executed to images. This mode allows the user to select whether the vividness enhancement process is executed to the images or not.

Also, it should be noted that there is provided a single black generation table to be referred to for conversion from the RGB values to the CMYK values, which allows a simple process after the black generation regardless of vividness enhancement process executed.

Although an example of carrying out the invention has been described, the scope of the present invention is not necessarily limited to the specific features or act described above. There are numerous variations and permutations of the above described system that fall within the spirit and scope of the invention. Another variations of the embodiment will be described below.

Second Embodiment

In the previous embodiment, a plain black with the RGB values (0, 0, 0) is set as a vividness enhancement target color. However, a vividness enhancement color may not necessarily be black, but may be another color. For example, by converting a yellowish orange to a reddish orange as a vividness enhancement target color, or a subdued red to a crimson as a target color, an equivalent vividness enhancement effect as black as a vividness enhancement target color may be achieved.

FIG. 19 is a chart illustrating transition of colors with a fixed hue in a color space defined by L*a*b* scheme. For example, a conversion BK from an unclear black to a plain black corresponds to the RGB conversion described in the previous embodiment. For another example, a conversion RD from an unclear red to a more vivid red, or a conversion PK from a grayish pink to a pink with increased saturation may be obtained by converting each color in a predetermined first area into a single vividness enhancement target color (as indicated with arrows in FIG. 19).

FIG. 20 shows a table for an RGB conversion of the conversion RD shown in FIG. 19 to converge an unclear red to the vivid red, and an example of calculated RGB values. Table 2R corresponds to Table 2 in the photograph mode in the previous embodiment, which is shown in FIG. 13B. In FIG. 20, a first area is set as an area wherein the RGB values are in a range (255, 0, 0)-(248, 15, 15) in the chromatic coordinate, which are relatively close to red. For the RGB values that fall into the first area, a conversion to red as a vividness enhancement target color is executed. The other RGB values that do not fall into the first area are set in a second area, wherein no vividness enhancement process is performed. The second area is further divided into an unconverted data area and a transition area. The unconverted data area is an area wherein the RGB values are in a range (239, 15, 15)-(255, 255, 255). All the subtracting values in the unconverted data area are set to (0, 0, 0), thus the original RGB values in the unconverted data area remain unconverted. The remaining RGB values are in the transition area, which is a part of a second area closer to the first area. The RGB values in the transition area are in a range (245, 15, 15)-(240, 15, 15). For the RGB values in the transition area are converted to visually smoothly connect the colors in the first area and the colors in the unconverted data area.

FIG. 21A is an example of a printed material that are not applied with the vividness enhancement process of the present embodiment, while FIG. 21B is an example of the printed material that are applied with the vividness enhancement process in the photograph mode. As can be seen, colored parts in the image shown in FIG. 21B are printed in clearer and vivid colors compared to the image shown in FIG. 21A.

FIG. 22 shows a table for an RGB conversion of the conversion PK shown in FIG. 19 to converge a grayish pink to a pink with increased saturation, and an example of calculated RGB values. Table 2P corresponds to Table 2 in the photograph mode in the previous embodiment, which is shown in FIG. 13B. In FIG. 22, a first area is set as an area wherein the RGB values are in a range (255, 206, 206)-(238, 218, 218) in the chromatic coordinate, which are relatively close to pink. For the RGB values that fall into the first area, a conversion to pink as a vividness enhancement target color is executed. The other RGB values that do not fall into the first area are set in a second area, wherein no vividness enhancement process is performed. The second area is further divided into an unconverted data area and a transition area. The unconverted data area is an area wherein the RGB values are in a range (229, 218, 218)-(255, 255, 255). All the subtracting values in the unconverted data area are set to (0, 0, 0), thus the original RGB values in the unconverted data area remain unconverted. The remaining RGB values are in the transition area, which is a part of a second area closer to the first area. The RGB values in the transition area are in a range (237, 218, 218)-(230, 218, 218). For the RGB values in the transition area are converted to visually smoothly connect the colors in the first area and the colors in the unconverted data area. When the conversion is completed, colored parts in the image are printed in less grayish and clearer pink.

Third Embodiment

In the image formation control system according to the previous embodiment of the invention, the color space of the image signals in the transition area is converted to transition colors that are based on the vividness enhancement target color in the first area. With this conversion method, a staged color transition (i.e., an pseudo-outline) near a border between the colors in the first area and the second area can be prevented from occurring. However, when such a staged color transition is tolerated, the transition area may not necessarily be provided. Also, when colors in the first area are black, a staged color transition may be tolerated, as generally such a staged color transition is substantially unrecognizable to human eyes.

FIG. 23 shows a table for an RGB conversion with no transition area provided, and an example of calculated RGB values when the colors in the first area are black. Table 2' corresponds to Table 2 in the photograph mode in the first embodiment, which is shown in FIG. 13B. In FIG. 23, a first area is set as an area wherein the RGB values are relatively small and in a range (0, 0, 0)-(12, 14, 19) in the chromatic coordinate, which are relatively close to black. The RGB values that fall into the first area are converted to a vividness enhancement target color (0, 0, 0), which is the plain black, by subtracting the subtracting values which are the same value as the original RGB values. The other original RGB values that are not included in the first area ((13, 14, 19)-(255, 255, 255) in the chromatic coordinate) are a second area, wherein the vividness enhancement process is not executed. It should be noted that the second area corresponds to an unconverted data area, and no transition area is provided in the second area.

FIG. 24 is a chart illustrating the RBG conversion process in the variation shown in FIG. 23. It should be noted that no transition area is provided, and the values in the first area (shown in a line partially overlaid on the horizontal axis) and the values in the unconverted data area (shown in a right up line) are disconnected.

As shown in FIGS. 23 and 24, the converted RGB values (0, 0, 0) at the border of the first area that are converted from the original RGB values (12, 14, 19) are relatively close to the RGB values (13, 14, 19) at the border of the unconverted data area, compared to the RGB values that need a transition process. Thus, a staged color transition in black is generally substantially unrecognizable to human eyes and may be tolerated. Therefore, the transition area may not necessarily be provided in a reference table in such a vividness enhancement process.

Fourth Embodiment

A reference table for an RGB conversion may be created by a user, when the user is familiar with table creation operations, or when the user is skilled in the vividness enhancement process in the above embodiments of the present invention. In this case, various parameters including chromatic coordinate values and a size of a first area, and a vividness enhancement target color are specified by the user.

FIG. 25 is a flowchart illustrating a process of creating an RGB conversion table performed by the CPU 101A of the main device 101. Steps that are equivalent to the steps in the flowchart shown in FIG. 10 are referred to with the same reference numbers, and description on those steps are omitted.

After RGB values of a desired image to be printed on a T-shirt TS are captured in S10, the process proceeds to S30', wherein a reference table is created by a user.

FIG. 26 is a flowchart illustrating the table creation process S30' in detail. In S31, a table creation window for the user (a first area designation window), which is prepared for the table creation process is displayed. More specifically, display signals are generated and output to the display 105, and an RGB input window is displayed on the display 105.

FIG. 27 is an illustrative view of an example of the RGB input window 120 shown on the display 105. On the left side of the RGB input window 120, there are provided six fields, which are R value input fields 120*a* and 120*b*, G value input fields 120*c* and 120*d*, and B value input fields 120*e* and 120*f*, to input RGB values to specify a range of the first area. By inputting a chromatic coordinate value in each field, the RGB values in the first area to be sharpen are specified. On the right side of the RGB input window 120, there are provided three fields, which are an output (i.e., target) R value field 120*g*, an output G value field 120*h*, and an output B value field 120*i*, to specify the vividness enhancement target color. At lower right of the RGB input window 120, there are provided an "OK" button 120*j* and a "Cancel" button 120*k*.

Referring back to FIG. 26, when S31 is completed, the process proceeds to S36 to judge whether the table creation process is canceled or not. If the "Cancel" button 120*k* is not pressed, the process proceeds to S32 to judge whether the RGB designation (i.e., designation of the range of the first area) in S31 is properly completed or not. If the values in the output R value field 120*g*, the output G value field 120*h*, and the output B value field 120*i* are not within ranges specified in the R value input fields 120*a* and 120*b*, the G value input fields 120*c* and 120*d*, and the B value input fields 120*e* and 120*f* respectively, the step proceeds to S35, wherein an error window 121(*b*), a window to indicate an error and a prompt window, a window to prompt proper input 121(*a*), are displayed, as shown in FIG. 8.

FIG. 28 is an illustrative view of a window shown on the display 105 when an input error occurs. In the window 121 (*a*), the input vividness enhancement target color is not in the range of the first area. The window 121(*b*) shows an error that an incorrect vividness enhancement target values are input. When the "OK" buttons 121*j* on the error window and the prompt window are pressed, the process proceeds to S31. When correct values are input in S31, the process proceeds to S32 again and judge the RGB values to specify the range of the first area. When each field 120*a*, 120*b*, 120*c*120*i* in the RGB input window 120 is judged to have been input properly, and the "OK" button 120j is pressed, the process proceeds to S33.

In S33, a second area and a transition area for RGB conversion are automatically set, and a reference table is created based on the RGB ranges specified in the RGB input window 120.

FIG. 29 is a flowchart illustrating the process S33 of the table creation to set the second area and the transition area in detail. In S209, R values that are necessary for a table creation are obtained from RGB values stored in the RAM 101C.

FIG. 30 is a flowchart illustrating the table creation procedure S209 shown in FIG. 29 in detail. In S201, the greater value of the two values that are input in the R value input fields 120a and 120b is obtained as R1, while the smaller value is obtained as R2. The value input in the output R value field 120g is obtained as Rgoal. If R1 is equal to Rgoal, the vividness enhancement process should make the original colors in the first area converted to be a brighter color. If R2 is equal to Rgoal, the original colors in the first area are converted to be a darker color. If R1 is greater than Rgoal, and Rgoal is greater than R2, the original colors in the first area are converted to a color in the middle, that is, for example, both brighter reds and darker reds are converted to be a plain red. A difference between R1 and Rgoal (R1 subtracted by Rgoal) is obtained as R1range, while a difference between R2 and Rgoal (R2 subtracted by Rgoal) is obtained as R2range. The range of the first area is determined to be from the value of R1range and the value of R2range. If the value of R1range and R2range is positive, the vividness enhancement process converts the colors in the first range to a vividness enhancement target color which is a darker color. If the value of R1range and R2range is negative, the vividness enhancement process converts the colors in the first range to a vividness enhancement target color which is a brighter color. When each value is obtained, the process proceeds to S202.

In S202, the range of the transition area is determined. A distance from R1 to Rgoal is multiplied by n, and the result is obtained as R1fix, which is equal to (R1+R1range*n). A distance from R2 to Rgoal is multiplied by n, and the result is obtained as R2fix, which is equal to (R1−R2range*n). In this embodiment, n is equal to 1. A range from R1 to R1fix plus a range from R2 to R2fix is an unconverted data area of the second area. When the unconverted data area is determined, the process proceeds to S203.

In S203, the value for R1fix is corrected. The value for R1 should be in a range from 0 to 255. Therefore, when R1fix is greater than 255, the process proceeds to S204, wherein R1fix is corrected to 255. Thereafter, the process proceeds to S205.

In S205, R2fix is corrected. The value for R2 should be in a range from 0 to 255. Therefore, when R2fix is smaller than 0, the process proceeds to S206, wherein R2fix is corrected to 0. Thereafter, the process proceeds to S207.

In S207, each value for R1, R2, R1range, R2range, R1fix, R2fix is stored in the RAM 101C of the main device 101. Thereafter, the process returns to S209 shown in FIG. 29. Thus, the first area, the transition area, the unconverted data area, and the second area for the R values are determined.

In S219, similarly to the R values, each value for G1, G2, G1range, G2range, G1fix, G2 fix is obtained. The obtained values are stored in the RAM 101C of the main device 101. Thus, the first area, the transition area, the unconverted data area, and the second area for the G values are determined. The process proceeds to S229.

In S229, similarly to the R values and the G values, each value for B1, B2, B1range, B2range, B1fix, B2 fix is obtained. The obtained values are stored in the RAM 101C of the main device 101. Thus, the first area, the transition area, the unconverted data area, and the second area for the B values are determined. The process proceeds to S240.

In S240, all the RGB values that are to be included in the first area are obtained from the values stored in the RAM 101C of the main device 101. The R values are from R2 to R1, the G values are from G2 to G1, and the B values are from B2 to B1. With all these values, every combination of RGB in the first area is obtained.

In S241, all the RGB values that are to be included in the unconverted data area of the second area are obtained from the values stored in the RAM 101C of the main device 101. The R values are from the minimum value 0 to R2 and from R1 to the maximum value 255, the G values are from the minimum value 0 to G2 and from G1 to the maximum value 255, and the B values are from the minimum value 0 to B2 and from B1 to the maximum value 255. With all these values, every combination of RGB in the unconverted data area is obtained.

In S242, every combination of the RGB values, which is $256^3$ combinations, is obtained. Thereafter, the process proceeds to S243.

In S243, all the RGB value to be included in the transition area of the second area are obtained. To obtain the RGB values in the transition area, the RGB values in the first area obtained in S240 and the RGB values in the unconverted area obtained in S241 are subtracted. With the procedures executed in S240, S241 and S243, every combination of the RGB values are assigned to any of the first area, the transition area, and the unconverted area. The process proceeds to S244.

In S244, the original RGB values before the conversion (RGBinputs), the converted RGB values (RGBoutputs), and the subtracting values (RGBcals) in the first area are obtained from the RGB values obtained in S240. RGBinputs correspond to all the RGB values in the first area, while RGBoutputs correspond to Rgoal, Ggoal, and Bgoal. RGBcals are obtained from RGBinputs subtracted by RGBoutputs. The process proceeds to S245.

In S245, the original RGB values before the conversion (RGBinputs) and the subtracting values (RGBcals) in the second area are obtained from the RGB valued obtained in S241. RGBinputs correspond to all the RGB values in the unconverted data area of the second area, while RGBcals are all (0, 0, 0), as the converted RGB values (RGBoutputs) are equal to RGBinputs. The process proceeds to S246.

In S246, the original RGB values before the conversion (RGBinputs) and the subtracting values (RGBcals) in the transition area are obtained from the RGB values obtained in S243. RGBinputs correspond to all the RGB values in the transition data area of the second area. From RGBinputs, a certain R value (Rsmooth-in) is extracted. Rsmooth-in is a value in the transition area in a range from R1 to R1fix. Based on this value, another R value (Rsmooth-out) is obtained. In S246, when Rsmooth-in is in between Rgoal and R1, or in between R2 and Rgoal, at least one of RGB values exists in the transition area. Therefore, the other RGB values in the first area or the unconverted data area are all set to be converted to be the RGB values of the vividness enhancement target color. Thus, every Rsmooth-out corresponds to Rgoal. Thereafter, Rsmooth-in subtracted by Rsmooth-out is obtained as the subtracting value Rcal. Similarly, Gsmooth-in subtracted by Gsmooth-out is obtained as the subtracting value Gcal. Also, Bsmooth-in subtracted by Bsmooth-out is obtained as the subtracting value Bcal. The process proceeds to S247.

In S247, Rsmooth-out is obtained when Rsmooth-in is in between R1 and R1fix. In this case, a distance from Rgoal+1 (i.e., an R value next to the vividness enhancement target value) to R1fix is equivalent to R1range*2. Therefore, Rsmooth-out is equal to R1+R1range*2/R1range. This calculation is applied until Rsmooth-out is reached to R1fix. Similarly, R2smooth-out is equal to R1range*2/R1range−R2. This calculation is applied until R2fix is reached to Rsmooth-out. Thereafter, Rsmooth-in subtracted by Rsmooth-out is obtained as the subtracting value Rcal. Similarly, Gsmooth-in subtracted by Gsmooth-out is obtained as the subtracting value Gcal. Also, Bsmooth-in subtracted by Bsmooth-out is obtained as the subtracting value Bcal. The process proceeds to S248.

In S248, a reference table is created based on all the original RGB values before the conversion (RGBinputs) obtained in S240-S247 and the corresponding subtracting values (RGBcals). The process returns to S33 shown in FIG. 26.

In S33, the created reference table is stored in the RAM 101C of the main device 101. The table creation process is completed.

FIG. 31 is an example of a reference table for the RGB conversion created by a user. In this table, for the R value input field 120*a*, 0 is input as R2, and the R value input field 120*b* is 30 (R1). The G value input field 120*c* is 0 (G2), and 120*d* is 30 (G1). The B value input field 120*e* is 0 (B2), and 120*f* is 30 (B1). The output R value field 120*g* is input with 0 (Rgoal), the output G value field 120*h* is input with 0 (Ggoal), and the output B value field 120*i* input with 0 (Bgoal).

In FIG. 31, the RGB values in a range (0, 0, 0)-(15, 15, 15) in the chromatic coordinate are included in the first area. The RGB values in a range (16, 0, 0)-(30, 30, 30) in the chromatic coordinate are included in the transition area of the second area, the RGB values in a range (31, 30, 30)-(255, 255, 255) in the chromatic coordinate are included in the unconverted data area of the second area.

Thus, in accordance with the process shown in FIG. 29, the first area is set. Successively, the transition area with RGB values which are in a double-width of the RGB values in the first area (in a range (16, 0, 0)-(30, 30, 30) in the chromatic coordinate) is set automatically. In the first area, the RGB values at the end (i.e., the RGB values at the border of the first area to the transition area) are (15, 15, 15), which are equal to the subtracting values thereto. The subtracting values in the transition area are set automatically to be deceased from (15, 15, 15) gradually, so as the subtracting values at the border of the unconverted area become (0, 0, 0). The subtracting values in the second area corresponding to the original RGB values in a range (31, 30, 30)-(255, 255, 255) are all set to (0, 0, 0).

After the first are, second area including the transition area and the unconverted data area are set as described above, the process proceeds to S34.

In S34, each value set and stored as temporary data is built into a table, and stored in a predetermined memory device, for example the RAM 101C of the main device 101.

After S34 is completed, the process proceeds to S40 shown in FIG. 25. In S36, if the "Cancel" button 120*k* in the RGB input window 120 is pressed, the process proceeds to S40 shown in FIG. 25.

Description on S40 and the following steps is omitted, as S40 and the following steps are similar to the steps in the process of the first embodiment shown in FIG. 10 except the reference table used is the table created in S30'.

It should be noted that S201-S241, S242, S243 shown in FIG. 29, which are executed by the CPU 101A, correspond to the judging method that judges the second area excluding the first area based on the information in the first area that is specified by an input method according to each claim.

With this method described in the present embodiment, the RGB conversion based on a table created by a user is enabled, and a detailed vividness enhancement process is obtained.

In the embodiment described above, the range of the first area and the vividness enhancement target color are specified by the input operation of the user to the value input fields 120*a*-120*i*, then the range and the size of the second area, the existence of the transition area, and the range of the second area are automatically determined. However, these entries may be specified by the users input operation as well as the input operation for the first area. If some of the entries remain unspecified by the user, those entries may be determined automatically. The number of the first area or the second area is not limited to one, therefore, ranges and sizes of at least one first area and one second area, number of areas, a vividness enhancement target color, the existence of a transition area should be specified by the user, and the remaining may be determined automatically.

In S29, as described above, interpolation in the transition area is based on each RGB value which is individually determined. However, other interpolation method is known. For example, a vividness enhancement target value (Rgoal, Ggoal, Bgoal) is set as an origin, and a value R is set on the x axis, a value G is set on the y axis, and a value B is set on the z axis. A line connecting a value (R1fix, G1fix, B1fix), which is out side the transition area, with the origin is set as a radius of a sphere. By adjusting the distance from a point on the sphere and the origin, a smooth interpolation in the transition area is obtained. Also, a cube may be used for interpolation instead of a sphere. Further, a point of intermediate values between R1 and R1fix, G1 and G1fix, and B1 and B1fix may be calculated, and the point may be set as the center of the transition area for a smoothing process.

Fifth Embodiment

A vividness enhancement process may be performed on the T-shirt printer 1 with a program according to the present invention stored in the ROM 82 of the control unit 80 in the T-shirt printer 1.

FIG. 32 is a flowchart illustrating an image processing procedure performed by the CPU 101A of the image formation controlling system 100 when the T-shirt printer 1 performs vividness enhancement process to unconverted data. The flow shown in FIG. 32 corresponds to the procedure shown in FIG. 10 of the previous embodiment. Steps that are equivalent to the steps in the flowchart shown in FIG. 10 are referred to with the same reference numbers, and description on those steps are omitted.

In S10", RGB values of a desired image to be printed on a T-shirt TS are obtained from the image formation control system 101. The process proceeds to S20".

In S20", the process modes, which are prepared for the vividness enhancement process on the T-shirt printer 1, are displayed for the user to view. More specifically, display signals are generated and output to the display 41 on the operation panel 40 through the display controlling unit 87. A view of a mode selection window shown on the display 41 is omitted, however, it should show a window for the user to select one of the "monitor matching" mode, the "photograph" mode, the "graphic" mode, and the "vivid" mode similarly to the mode selection window 110 on the display 105 of the main device 101 shown in FIG. 11. When S20" is completed, the process proceeds to S30".

S30" is similar to S30 shown in FIG. 10, except the process is performed by the CPU 101A. The process proceeds to S40".

In S40", whether a printing instruction (by e a "print start" button, for example, on the operation panel 40) is given by a user through the input sensing unit 88 or not is determined.

With these steps described above, similarly to the previous embodiment, an image with sharp, vivid, clear, and fresh colors, which are generally preferred for images on fabrics, is achieved.

Sixth Embodiment

A vividness enhancement process in the present invention may be performed in any stage as the image data are processed from the RGB scheme, through the color matching process and the CMYK scheme, and finally to the binary scheme. Thus, the vividness enhancement process may not be applied to the RGB values, and after the RGB values are converted to CMYK values in S53, the vividness enhancement process may be applied, by referring to a table created correspondingly to each mode. Thereafter, the sharpened CMYK values may be converted to binary values, and may be transmitted to the T-shirt printer 1. It should be noted that when black generation is performed, RGB values may not be converted directly to CMYK values. If the values should be converted to XYZ tristimulus values or a color space in L*a*b* scheme defined by CIE, which are not dependent on each device, the RGB values may be converted by referring to a table that corresponds to each reference table described above.

Further, the data that the image formation controlling system 100 or the T-shirt printer 1 receives may be in the CMYK scheme. In this case, the RGB values described in the above embodiments are altered to CMYK values, and each table has $256^4$ combinations. Also, LUT is in the CMYK scheme, however, black generation is not necessary.

When the CMYK values are input to the T-shirt printer 1, a vividness enhancement process may be applied to the CMYK values in the CPU 81 of the control unit 80 by referring to a table that corresponds to each mode in the RGB scheme. In that case, binary values may be generated from the CMYK values before or after the vividness enhancement in the T-shirt printer 1 to be printed. Also with these methods, similarly to the previous embodiment, an image with sharp, vivid, clear, and fresh colors, which are generally preferred for images on fabrics, is achieved.

In the embodiments described above, only one first area is provided in a predetermined range and size of the color space, however, two or more first areas may be provided. For example, two or more of the conversions described above and shown in FIG. 20, the conversion BK from an unclear black to a plain black, a conversion RD from an unclear red to a more vivid red, and a conversion PK from a grayish pink to a pink with increased saturation, may be performed simultaneously. In this case, a plurality of vividness enhancement target colors are set.

It should be noted that ranges and sizes of at least one first area and one second area, number of areas, a vividness enhancement target color, the existence of a transition area may not be necessarily specified when a mode is selected. At least two combinations of each entry should be specified when the user select a mode, however, the remaining entries may be unified regardless of a mode selection, or may be specified by further operation from the user.

Although examples of carrying out the invention have been described, those skilled in the art will appreciate that there are numerous variations and permutations of the above described devices that fall within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

What is claimed is:

1. An image formation control system, comprising:

an input system that is adapted to input instruction signals concerning a vividness enhancement target color of image signals input by a user, and a vividness enhancement processing system that is adapted to apply a vividness enhancement process by converting at least one first area of a color space concerning the image signals to a single vividness enhancement target color corresponding to each first area according to the instruction signals from the user input through the input system, and by determining a second area which is an area other than the first area of the color space wherein the vividness enhancement process is not applied, the first area and second area being included within a single image, wherein the image signals which are processed by the vividness enhancement process are converted to image formation data transmitted to a printer.

2. The image formation control system according to claim 1, wherein the vividness enhancement processing system is provided with a transition processing system which is adapted to convert the color space of the image signals in a part of the second area that is closer to the first area to transition colors that are set according to the vividness enhancement target color in the first area.

3. The image formation control system according to claim 2, wherein the transition processing system converts the color space of the image signals in the part of the second area that is closer to the first area to the transition colors by interpolating color coordinate values of the color space in the part of the second area.

4. The image formation control system according to claim 2, wherein the input system is adapted to input selection signals to select a desired mode from a plurality of modes that are provided corresponding to a degree of the vividness enhancement process, wherein the vividness enhancement processing system determines at least two combinations of a range of at least one of the first area and the second area, a size of at least one of the first area and the second area, a number of at least one of the first area and the second area, the vividness enhancement target color, and existence of a transition processing by the transition processing system according to the selection signal.

5. The image formation control system according to claim 3, wherein the input system is adapted to input selection signals to select non-processing mode in which no vividness enhancement process is performed.

6. The image formation control system according to claim 3, wherein the input system is adapted to input selection signals to select a desired mode from a plurality of modes that are provided corresponding to a degree of the vividness enhancement process, wherein the vividness enhancement processing system determines at least two combinations of a range of at least one of the first area and the second area, a size of at least one of the first area and the second area, a number of at least one of the first area and the second area, the vividness enhancement target color, and existence of a transition processing by the transition processing system according to the selection signal.

7. The image formation control system according to claim 6, wherein the input system is adapted to input selection signals to select non-processing mode, wherein no vividness enhancement process is performed.

8. The image formation control system according to claim 1, wherein the input system is adapted to input selection signals to select a desired mode from a plurality of mode that are provided corresponding to a degree of the vividness enhancement process, wherein the vividness enhancement processing system determines at least two combinations of a range of at least one of the first area and the second area, a size of at least one of the first area and the second area, a number of at least one of the first area and the second area, the vividness enhancement target color, and existence of a transition processing by the transition processing system according to the selection signal.

9. The image formation control system according to claim 1, wherein the input system is adapted to input selection signals to select non-processing mode, wherein no vividness enhancement process is performed.

10. The image formation control system according to claim 1, wherein the input system is adapted to input instruction signals specified by the user regarding a range, size, and the vividness enhancement target color of the first area, and the vividness enhancement processing system comprises a judging system that judges the second area excluding the first area based on information on the first area specified with the input system, and determines at least two combinations of a range of at least one of the first area and the second area, a size of at least one of the first area and the second area, a number of at least one of the first area and the second area, the vividness enhancement target color, and existence of a transition processing by the transition processing system according to the selection signal.

11. The image formation control system according to claim 1, wherein colors in the first area are located near the surface in a color system of an L*a*b* scheme.

12. The image formation control system according to claim 1, wherein the vividness enhancement processing system is adapted to set the first area and the second area in the color space by converting RGB values concerning the image signals, and convert the color space in the first area to the vividness enhancement target color.

13. The image formation control system according to claim 1, wherein the vividness enhancement processing system is adapted to set the first area and the second area in the color space by converting L*a*b* values concerning the image signals, and convert the color space in the first area to the vividness enhancement target color.

14. The image formation control system according to claim 1, wherein the vividness enhancement processing system is adapted to set the first area and the second area in the color space by converting CMYK values concerning the image signals, and convert the color space in the first area to the vividness enhancement target color.

15. An image formation controlling method, comprising:

inputting instruction signals concerning a vividness enhancement target color of image signals from a user, and converting at least one first area of a color space concerning the image signals to a single vividness enhancement target color corresponding to each first area according to the instruction signals from the user input and determining a second area which is the remaining area of the color space wherein the vividness enhancement process is not applied, the first area and second area being included within a single image, wherein the image signals which are applied with the vividness enhancement process are converted to output data for a printer.

16. An image formation controlling method, comprising:

an input process to input image signals and instruction signals from a user concerning the image signals, converting at least one first area of a color space concerning the image signals to a single vividness enhancement target color corresponding to each first area according to the instruction signals from the user input through the input process and determining a second area which is the remaining area of the color space wherein the vividness enhancement process is not applied, the first area and second area being included within a single image, and a process to print images based on the image signals which are applied with the vividness enhancement process.

17. A computer-readable media embedded with a computer program which allows a computer to perform an image formation controlling process, the process including the steps of:

inputting instruction signals concerning a vividness enhancement target color of image signals from a user;

converting at least one first area of a color space concerning the image signals to a single vividness enhancement target color corresponding to each first area according to the instruction signals from the user input and determining a second area which is the remaining area of the color space wherein the vividness enhancement process is not applied, the first area and second area being included within a single image; and outputting the image signals which are applied with the vividness enhancement process as output data for a printer.

18. An image formation control device, comprising:

an input system to input instruction signals concerning a vividness enhancement target color of image signals entered by a user; and a vividness enhancement processing system to apply a vividness enhancement process by converting at least one first area of a color space concerning the image signals into a single vividness enhancement target color corresponding to each first area according to the instruction signals from the user's input through the input system, and by determining a second area which is an area other than the first area of the color space wherein the vividness enhancement process to the single vividness enhancement target color is not applied;

wherein the vividness enhancement processing system includes a transition processing system to convert the color space of the image signals in an intermediate area, between the first area and an unconverted data area included in the second area, into transition colors which are defined by a straight line connecting the first area and the unconverted data area, in coordinates with a horizontal axis indicating a distance from the single vividness enhancement target color before conversion by the vividness enhancement processing signal and a vertical axis indicating a distance from the single vividness enhancement target color after conversion;

wherein the input system inputs the instruction signals being selection signals to select a desired mode among a plurality of modes, in which connection points to connect the first area and the unconverted data area are set to be different, according to a degree of the vividness enhancement process desired by the user;

wherein the image signals processed by the vividness enhancement processing system are converted into printable-formatted data, and wherein the first area and second area are included within a single image.

19. The image formation control device according to claim 18, wherein the vividness enhancement processing system determines a combination of at least two among:

a range of at least one of the first area and the second area;

a size of the at least one of the first area and the second area;

a number of the at least one of the first area and the second area;

the vividness enhancement target color; and presence of a transition process by the transition processing system, in order to perform the vividness enhancement process according to the selection signals.

20. The image formation control device according to claim 18, wherein the vividness enhancement processing system interpolates the color space of the image signals in the intermediate area.

21. The image formation control device according to claim 18, wherein the input system inputs selection signals to select a non-processing mode, in which no vividness enhancement process is performed.

22. The image formation control device according to claim 18, wherein the input system inputs the instruction signals being information concerning at least a range, a size, and the vividness enhancement target of the first area, which are specified by the user;

wherein the vividness enhancement processing system includes a judging system to judge the second area excluding the first area based on the information concerning the first area inputted by the input system; and wherein the vividness enhancement processing system determines a combination of at least two among a range of at least one of the first area and the second area, a size of the at least one of the first area and the second area, a number of the at least one of the first area and the second area, the vividness enhancement target color; and presence of a transition process by the transition processing system, in order to perform the vividness enhancement process according to the instruction signals.

23. The image formation control device according to claim 18, wherein colors in the first area are located near the surface in a color system of an L*a*b* scheme.

24. The image formation control device according to claim 18, wherein the vividness enhancement processing system converts RGB values concerning the image signals to set the first area and the second area in the color space and to convert the color space of the first area into the single vividness enhancement target color.

25. An image formation controlling method, comprising steps of:

inputting instruction signals concerning a vividness enhancement target color of image signals entered by a user;

applying a vividness enhancement process by converting at least one first area of a color space concerning the image signals into a single vividness enhancement target color corresponding to each first area according to the instruction signals from the user's input in the step of inputting, and by determining a second area which is an area other than the first area of the color space wherein the vividness enhancement process to the single vividness enhancement target color is not applied;

converting the color space of the image signals in an intermediate area, between the first area and an unconverted data area included in the second area, into transition colors which are defined by a straight line connecting the first area and the unconverted data area, in coordinates with a horizontal axis indicating a distance from the single vividness enhancement target color before conversion by the vividness enhancement processing signal and a vertical axis indicating a distance from the single vividness enhancement target color after conversion; and converting the image signals processed in the step of vividness enhancement into printable-formatted data, wherein the step of inputting includes inputting the instruction signals being selection signals to select a desired mode among a plurality of modes, in which connection points to connect the first area and the unconverted data area are set to be different, according to a degree of the vividness enhancement process desired by the user, and wherein the first area and second area are included within a single image.

26. An image formation controlling method, comprising steps of:

inputting image signals and instruction signals concerning a vividness enhancement target color of the image signals entered by a user;

applying a vividness enhancement process by converting at least one first area of a color space concerning the image signals into a single vividness enhancement target color corresponding to each first area according to the instruction signals from the user's input in the step of inputting, and by determining a second area which is an area other than the first area of the color space wherein the vividness enhancement process to the single vividness enhancement target color is not applied;

converting the color space of the image signals in an intermediate area, between the first area and an unconverted data area included in the second area, into transition colors which are defined by a straight line connecting the first area and the unconverted data area, in coordinates with a horizontal axis indicating a distance from the single vividness enhancement target color before conversion by the vividness enhancement processing signal and a vertical axis indicating a distance from the single vividness enhancement target color after conversion; and printing an image based on the image signals processed in the step of vividness enhancement, wherein the step of inputting includes inputting the instruction signals being selection signals to select a desired mode among a plurality of modes, in which connection points to connect the first area and the unconverted data area are set to be different, according to a degree of the vividness enhancement process desired by the user, and wherein the first area and second area are included within a single image.

* * * * *